United States Patent [19]

Hsu et al.

[11] Patent Number: 5,948,100
[45] Date of Patent: Sep. 7, 1999

[54] BRANCH PREDICTION AND FETCH MECHANISM FOR VARIABLE LENGTH INSTRUCTION, SUPERSCALAR PIPELINED PROCESSOR

[75] Inventors: Chia-Chang Hsu; Ruey-Liang Ma; Chien-Kuo Tien; Kun-Cheng Wu, all of Taiwan, Taiwan

[73] Assignee: Industrial Technology Research Institute, Hsinchu, Taiwan

[21] Appl. No.: 08/972,226

[22] Filed: Nov. 17, 1997

[30] Foreign Application Priority Data

Mar. 18, 1997 [CN] China ................................. 86103546

[51] Int. Cl.⁶ .................................................. G06F 13/00
[52] U.S. Cl. ......................... 712/238; 712/237; 712/239; 712/240
[58] Field of Search .................................... 712/237, 238, 712/239, 240, 20–41, 204, 205–213

[56] References Cited

U.S. PATENT DOCUMENTS

| 5,093,778 | 3/1992 | Favor et al. | 395/375 |
| 5,163,140 | 11/1992 | Stiles et al. | 395/425 |
| 5,230,068 | 7/1993 | Van Dyke et al. | 395/375 |
| 5,327,536 | 7/1994 | Suzuki | 395/375 |
| 5,327,547 | 7/1994 | Stiles et al. | 395/425 |
| 5,353,421 | 10/1994 | Emma et al. | 395/375 |
| 5,367,703 | 11/1994 | Levitan | 395/800 |
| 5,414,822 | 5/1995 | Saito | 712/240 |
| 5,442,756 | 8/1995 | Grochowski et al. | 395/375 |
| 5,574,871 | 11/1996 | Hoyt | 712/200 |

OTHER PUBLICATIONS

M. Johnson, Superscalar Microprocessor Design, pp. 9–24, 57–77, (1991).

Primary Examiner—Meng-Ai T. An
Assistant Examiner—Stacy Whitmore
Attorney, Agent, or Firm—Proskauer Rose LLP

[57] ABSTRACT

A processor architecture is disclosed including a fetcher, packet unit and branch target buffer. The branch target buffer is provided with a tag RAM that is organized in a set associative fashion. In response to receiving a search address, multiple sets in the tag RAM are simultaneously searched for a branch instruction that is predicted to be taken. The packet unit has a queue into which fetched cache blocks are stored containing instructions. Sequentially fetched cache blocks are stored in adjacent locations of the queue. The queue entries also have indicators that indicate whether or not a starting or final data word of an instruction sequence is contained in the queue entry and if so, an offset indicating the particular starting or final data word. In response, the packet unit concatenates data words of an instruction sequence into contiguous blocks. The fetcher generates a fetch address for fetching a cache block from the instruction cache containing instructions to be executed. The fetcher also generates a search address for output to the branch target buffer. In response to the branch target buffer detecting a taken branch that crosses multiple cache blocks, the fetch address is increased so that it points to the next cache block to be fetched but the search address is maintained the same.

11 Claims, 12 Drawing Sheets

FIG. 4
(PRIOR ART)

a) ADD R1,R2 | IF | D1 | D2 | T | EX | WB | RET | b) LOAD R2,[R3]
   ADD R1,R2

| IF | D1 | D2 | T | AC1 | AC2 | D$ |
|    |    | D2 | T | EX  | EX  | EX | EX | c) ADD R1,R2 | IF | D1 | D2 | T | Q | Q | Q | Q | EX | d) BR target
   <target>

| IF | D1 | D2 | T | AC1 | AC2 |
|    |    | SC | ARB | T | V | IF | D1 | D2 | e) COMP,=R1,R2
   BR target
   <target>
   ⋮

FROM BPC

CONDITION RESOLVED

CORRECT PATH

BRANCH PREDICTION AND FETCH MECHANISM FOR VARIABLE LENGTH INSTRUCTION, SUPERSCALAR PIPELINED PROCESSOR

RELATED APPLICATION

The subject matter of this application is related to the subject matter of the following patents and patent applications:

(1) U.S. patent application Ser. No. 08/834,312, entitled "Apparatus and Method for Parallel Decoding of Variable-Length Instructions in a Superscalar Pipelined Data Processing System," filed on Feb. 27, 1997 for Shi-Sheng SHANG and Dze-Chaung WANG, now U.S. Pat. No. 5,752,070 and (2) U.S. patent application Ser. No. 08/834,312, entitled "A Reorder Buffer Architecture for Accessing Partial Word Operands," filed on Apr. 15, 1997 for Chien-Kou V. TIEN, Ching-Tang CHANG and George Shiang Jyh LAI.

All of the above-listed patents and patent applications are commonly assigned to the assignee of this application and are incorporated herein by reference.

FIELD OF THE INVENTION

The present invention pertains to processor design. In particular, the present invention pertains to branch instruction prediction and instruction fetching in a superscalar pipelined processor that accommodates variable length instructions.

BACKGROUND OF THE INVENTION

Processor architectures have been improved over time to reduce the amount of time required to process program instructions and to speed up the overall execution of programs. One common processor architecture improvement is the incorporation of one or more cache memories on the processor chip itself. A cache memory is a small high speed memory which stores a copy of some of the information, i.e., program instructions and/or data, also stored in the main memory. Unlike the slow main memory, the cache operates at a high speed which can be equal to the processing speed of the processor. Although cache memories only store a smaller amount of information than the main memory, they tend to provide a dramatic speed up in memory access. This is because cache memories tend to exploit the spatial and temporal locality of reference properties of memory access. The spatial locality of reference property is the likelihood of accessing memory locations adjacent to other recently accessed memory locations. Instructions tend to be executed in short sequences, wherein the individually executed instructions in each sequence are stored in the same order in which they are executed. To exploit the spatial locality of reference property, the cache memory is organized so as to store large subsequences of data words, e.g., 16 byte long subsequences referred to as data lines or blocks. When a block containing an instruction is first fetched and loaded into the cache, the likelihood increases that future data accesses can also be satisfied by the recently fetched block. The temporal locality of reference property is the tendency of repeatedly executing certain instruction sequences by virtue of flow control instructions such as loops, subroutines and branch instructions. To exploit the temporal locality of reference property, the cache memory tends to retain each fetched block and preferably only relinquishes (erases) a fetched block if another processor or device desires to write into the data words of the block or if the cache memory runs out of space.

Another technique for increasing processing speed is referred to as "pipelining." In general, the processing of an instruction may require the sequential steps of fetching the instruction, decoding the instruction, fetching the operands of the instruction, executing the instruction and writing back the results of the execution. In a pipelined processor, the processing steps of several instructions are overlapped so as to minimize the delay in executing the instructions in sequence. As an illustration, consider a five stage pipeline with five sequential processing stages for performing the above noted five functions as applied to a sequence of five instructions. Assume that each stage of the pipeline requires one cycle to perform its respective function. Then each of the first, second, third, fourth and fifth instructions are inputted to the pipeline (in particular, the fetching stage of the pipeline) one instruction per cycle. After the fifth instruction is inputted, the first instruction will be in the write back stage, the second instruction will be in the execution stage, the third instruction will be in the operand fetch stage, the fourth instruction will be in the decoding stage and the fifth instruction will be in the fetching stage.

To further increase processing performance, multiple pipeline stages, most notably, execution stages, may be provided which can simultaneously operate on different instructions. Such processors are referred to as superscalar processors. Superscalar processors may incorporate an additional technique in which a sequence of instructions may be executed, and results for such instructions may be stored, in a some what arbitrary and different order than the strictly sequential order in which the instruction sequence is stored. This is referred to as out-of-order issue and out-of-order completion, respectively.

The ability of a superscalar processor to execute two or more instructions simultaneously depends upon the particular instructions being executed. Likewise, the flexibility in issuing or completing instructions out-of-order can depend on the particular instructions to be issued or completed. There are three types of such instruction dependencies referred to as resource conflicts, procedural dependencies and data dependencies. Resource conflicts occur when two instructions executing in parallel contend to access the same resource, e.g., the system bus. Data dependencies occur when the completion of a first instruction changes the value stored in a register or memory that is later accessed by a later completed second instruction.

Data dependencies can be classified into three types referred to as "true data dependencies," "anti-dependencies" and "output data dependencies". See MIKE JOHNSON, SUPERSCALAR MICROPROCESSOR DESIGN, p. 9–24 (1991). An instruction which uses a value computed by a previous instruction has a "true" (or data) dependency on the previous instruction. An example of an output dependency is, in out-of-order completion, where first and second sequential instructions both assign the same register or memory location to different values and a third instruction that follows the first and second instructions uses the value stored in the register or memory location as an operand. The earlier (first) instruction cannot complete after the later (second) instruction or else the third instruction will have the wrong value. An example of an anti-dependency also occurs in out-of-order execution wherein a later instruction, executed out of order and before a previous instruction, may produce a value that destroys a value used by the previous instruction. As illustrations of true dependency, output dependency and anti-dependency, consider the following sequence of instructions:

(1) R3:=R3 op R5
(2) R4:=R3+1
(3) R3:=R5+1
(4) R7:=R3 op R4

Instruction (2) has a true dependency on instruction (1) since the value stored in R3, to be used as an operand in instruction (2), is determined by instruction (1). Instruction (3) has an anti-dependency on instruction (2) since instruction (3) modifies the contents of register R3. If instruction (3) is executed out of order and before instruction (2) then instruction (2) will use the wrong value stored in register R3 (in particular, the value as modified by instruction (3)). Instructions (1) and (3) have an output dependency. Instruction (1) cannot complete out-of-order and after instruction (3) because the resulting value, as determined by instruction (3), must be the last value stored in register R3, not the resulting value as determined by instruction (1), so that instruction (4) will execute on the correct operand value stored in register R3. False dependencies can be removed using a register renaming technique and a reorder buffer.

A procedural dependency occurs where execution of a first instruction depends on the outcome of execution of a previous instruction, such as a branch instruction. See MIKE JOHNSON, SUPERSCALAR MICROPROCESSOR DESIGN, p. 57–77 (1991). It is difficult to know with certainty whether or not a particular branch will be taken. For sake of brevity, it is presumed that a branch is an instruction that either causes execution to continue at some pre-specified non-sequential address or allows execution to continue in sequence at the very next sequentially following instruction. In the former case, the branch is said "to have been taken," wherein in the latter case, the branch is said "to have not been taken." Branch instructions can be more complicated including indexed branch instructions, wherein the address to which the execution continues when the branch is taken dynamically varies according to a value stored in memory or in a register. Therefore, it is difficult to know with certainty which sequence of instructions should be executed after a branch instruction.

Branch instructions provide a problem for pipelined processors because they disrupt the sequential flow of instructions. In particular, for pipelining to function optimally, instructions must be inputted to each pipeline stage one instruction per cycle. However, the outcome of a branch instruction, in particular, whether or not the branch will be taken and to what address execution will branch, cannot always be known until after executing the branch instruction. Absent any special provisions, instructions can not be inputted to the processing pipeline after a branch instruction until after the branch instruction executes. Furthermore, consider that once the branch executes and the required instruction sequence is identified, the required instruction sequence might not be in an instruction cache and must be retrieved from main memory. This incurs a large delay in processing instructions.

To alleviate this problem, a number of branch prediction techniques can be used to predict whether or not a branch will be taken, which techniques can have an accuracy as high as 80%. See U.S. Pat. Nos. 5,163,140, 5,327,547, 5,327,536, 5,353,421, 5,442,756, 5,367,703, 5,230,068 and MIKE JOHNSON, SUPERSCALAR MICROPROCESSOR DESIGN, p. 71–75 (1991). Using a branch prediction technique, a prediction is made as to whether or not a branch will be taken. The sequence of instructions which would be executed if the prediction is correct is fetched and executed. However, any results of such instructions are treated as merely "speculative" until the branch instruction is in fact executed. When the branch instruction is executed, a determination is made as to whether or not the prediction was correct. If the outcome of the branch instruction was correctly predicted, the above-noted "speculative results" may be accepted. However, if the branch was incorrectly predicted, mis-prediction recovery steps are executed including discarding the speculative results and fetching the correct sequence of instructions for execution.

As an example of a branch prediction mechanism, consider the technique disclosed in U.S. Pat. No. 5,442,756. The processor architecture includes two six stage pipelines which each have a prefetch stage, a first decode stage, a second decode stage, an execution stage, a write back stage and a post write back stage. A branch target buffer is provided which operates in parallel with the first decode stage. The branch target buffer has multiple entries. Each entry stores a tag indicative of the address of a branch instruction to which it pertains. For reasons discussed below, the tag is in fact a portion of the address of the instruction which precedes the branch instruction and not the address of the branch instruction itself. Each entry also contains an address field which stores a "target address" or prediction of the address to which execution will branch upon executing the instruction and prediction history information regarding the history or the "takeness" of the branch. Initially, the branch target buffer is empty. When a branch instruction is executed and is taken, information regarding the branch instruction is stored in the branch target buffer. Illustratively, the branch target buffer is organized in a 4-way set associative fashion. The address of the instruction which precedes the branch instruction is therefore divided into an index or "set portion" and a "tag portion." For instance, suppose, each address is 32 bits long and 1k sets having four entries each are provided in the branch target buffer. The most significant ten bits of the address may be the set portion and the least significant twenty-two bits of the address may be the tag portion. The set portion is used to retrieve one of four branch target buffer entries corresponding to the set portion of the branch instruction address. The tag portion is then stored in the tag field of the retrieved entry. The address to which execution branches is stored in the target address field of the retrieved entry. A two bit counter of '11' is stored in the prediction history information to indicate that the branch is "strongly" taken.

Each time an instruction in either pipeline reaches the first decoding stage, its address is searched in the branch target buffer to determine if a branch prediction has been made therefor. The search is performed by accessing those branch target buffer entries corresponding to the same set as the address of the instruction decoded in the decoding stage and then by comparing the tag portion of the accessed entries to the tag portion of the address of the decoded instruction. If there is a match, the target address and prediction history information are retrieved and provided to a prefetching stage. If the prediction history bits are '11' ("strongly taken") or '10' ("weakly taken"), the target address is used to retrieve the next instruction for decoding. If the bits are '01' ("weakly not taken") or '00' ("strongly not taken") the target address is not used, and the instruction that sequentially follows the currently decoded instruction is fetched. Likewise, if no matching entry can be found in the branch target buffer, the instruction is presumed not to be a branch instruction or presumed to be a branch instruction for which the branch is not taken. In such a case, the instruction following the currently decoded instruction is fetched.

After the instruction for which the prediction was made is executed, the prediction is verified. If the branch is taken, the two bit counter is increased by one (or maintained at '11' if already at '11'). If the branch is not taken, the two bit counter is decreased by one (or maintained at '00' if already at '00'). Thus, the prediction history of each branch instruction is updated to reflect how frequently the branch was taken in recent executions of the instruction.

In the architecture described above, the address of the instruction which precedes the branch instruction, and not the address of the branch instruction itself, is used to store branch information in the branch target buffer. The reason for this pertains to the difficulties imposed by the types of instructions which must be executed. Processors can be classified as having either a complex instruction set computer (CISC) architecture or a reduced instruction set computer (RISC) architecture. RISC architecture processors have instructions which are all the same length. On the other hand, CISC architecture processors may have variable length instructions. For example, the x86 processor instruction set has instructions with lengths of 1–12 bytes (assuming that prefix codes are not counted).

In the above described architecture, the length of each variable length instruction is not known until the instruction is decoded in the decoder stage. In order to be able to input the instruction located at the target address (assuming that the branch instruction is predicted to be taken) into the pipeline stage on the cycle immediately after the branch instruction, the length of the branch instruction must be known. To that end, the prediction for the branch instruction is made when the instruction preceding the branch instruction is in the decoder stage—at which time the branch instruction is in the prefetch stage. Thereafter, on the next cycle, the branch instruction enters the decoder stage and its length is determined. This enables inputting the instruction that begins at the target address into the prefetch stage (using the target address determined in the previous cycle). The problem with this technique is that the branch instruction is not always preceded in its sequence by another instruction such as in the case where the branch instruction is the first instruction in the sequence.

A second more important problem with the above technique is that only a single instruction can be checked per cycle to determine if it is a branch instruction and if it is predicted to be taken. Again, this results because there is no advance information regarding the length of each instruction. Rather, the length of each instruction is not determined until the decoding stage. As a result, branch prediction is not performed in a parallel fashion but rather in a serial fashion thereby degrading the performance of a superscalar processor.

FIG. 1 depicts the architecture of the Pentium™ processor made by Intel™. Two processing pipelines are provided with five stages, namely, the prefetch, first decode, second decode, execution and write back stages. Branch prediction is performed in the decode stage. Only one branch instruction can be predicted per cycle—the branch target buffer can only determine if the very next branch instruction is taken or not taken. Furthermore, only one of the pipelines can execute conditional branch instructions. The possibility of a branch instruction crossing a cache block is checked and such branch instructions are reconstituted in the prefetch buffer. The penalty for mis-predicting a branch is one cycle.

FIG. 2 shows the architecture of Cyrix™'s M1™ processor. Like the Pentium™ processor, the M1™ performs branch prediction in the decode stage and therefore can only predict one branch per cycle. Likewise, checks for branch instructions, and reconstitution thereof, are performed in the prefetch buffer. Furthermore, conditional branch instructions can only be executed in one of the pipelines.

FIG. 3 shows the architecture of Nexgen™'s RISC86™ processor. Unlike the CISC processors, the RISC86™ is a RISC processor which uses a variable number of cycles to execute each instruction. This is illustrated in FIG. 4. Branch prediction is performed in the prefetch stage using a merged branch target buffer and instruction cache called a "branch prediction cache." The branch prediction cache has four fields including, a field for storing a branch instruction address, a target address, a branch history counter and a short sequence of instructions of 24 bytes that begins at the target address. A search address is received and is matched against each branch instruction stored in the branch instruction address field. If a matching branch instruction address is identified, the prediction counter associated with the matching branch instruction address is consulted to determine if the branch is taken. If the branch is predicted to be taken, the short instruction sequence of 24 bytes is retrieved and outputted. A shortcoming of this architecture is that only one instruction can be fetched and decoded per cycle. Thus, branch prediction can be performed on only the single instruction fetched per cycle. This architecture therefore does not support the superscalar execution paradigm according to which the processor can perform branch prediction on multiple instructions each cycle. Checks for branch instructions, and reconstitution thereof, are performed in the prefetch buffer. However, there is no penalty (in terms of lost cycles) for branch mis-prediction.

FIG. 5 shows the architecture of American Microdevices™ AMD5K86™. In the AMD5K86™, predecoder bits indicating instruction boundaries are added to each cache block as it is loaded into the prefetch buffer. In addition, the branch target buffer is merged with the instruction cache. Thus, prediction is performed in the fetch stage. Furthermore, the instruction cache itself can be used to determine the next cache block to fetch. However, no checks are provided for branch instructions which cross cache blocks. No penalty is incurred for branch mis-prediction. Furthermore, the AMD5K86™ provides full superscalar support.

FIG. 6 shows the architecture of Intel™'s PentiumPro™ processor. The PentiumPro™ provides full superscalar support. A separate branch prediction stage is provided before the prefetch stage which performs branch prediction. The branch target buffer can examine up to N data words in a cache block per cycle for a taken branch, where N is the number of data words in a cache block. However, there is a one cycle penalty for mis-predicting a branch instruction.

MIKE JOHNSON, SUPERSCALAR MICROPROCESSOR DESIGN, p. 71–75 (1991) discloses an architecture in which the instruction cache is merged with the branch target buffer in a RISC architecture processor. In particular, "fetch information" is associated with each instruction cache block. The "fetch information" includes, amongst other things, a successor index field and a branch block index field. The successor index field indicates the next cache block to be fetched and the first data word of the first instruction within this to-be-fetched cache block at which execution should begin. If a prediction has been made on a branch instruction within the cache block, the successor index field will correspond to a non-sequential cache block. The branch block index field indicates an end point of an instruction sequence within a cache block (if the instruction sequence ends on a data word within the cache block). In this architecture, the successor index field only contains a trailing portion of the address of the next block to be fetched. Each cache block stores a preceding tag portion of its own address. In other words, the successor index alone is not enough to identify the cache block containing the target address of the branch instruction. Rather, the cache blocks must somehow be sequentially ordered in the instruction cache so that the cache block containing the target address succeeds the cache block containing the branch thereto. In such a case, the tag address portion associated with the succeeding cache block containing the target address can simply be concatenated with the successor index in the preceding cache block containing the branch thereto in order to determine the address of the next instruction (in the succeeding cache block) to be executed.

In operation, each cache block is sequentially fetched from the instruction cache and the instructions therein are inputted to a successive stage of an execution pipeline. The successor index of a currently fetched cache block is obtained and concatenated with the tag portion of the next sequentially fetched cache block to produce the address of the next instruction to be executed. Each instruction is sequentially inputted to the next stage of the execution pipeline until the instruction stored at the location indicated by the branch index field is reached. At such a point, execution switches to the instruction at the address formed by concatenating the successor index of the current cache block to the tag address of the next cache block in the next cache block.

This architecture enables performing branch prediction on all instructions in a cache block at once. That is, as soon as a cache block is fetched, the next branch instruction predicted to be taken can be immediately identified and the target address therefor can be immediately determined regardless of whether the branch instruction is the first, second, ..., or last instruction in the cache block. Of course, this is a simple task in the RISC architecture processor in which the proposed scheme is implemented. The proposed technique is much more difficult in a CISC architecture processor where the instructions, in particular, the branch instructions have a variable length. In CISC architecture processors, there is no guarantee that the beginning or end of a block will be aligned with an instruction beginning or end. Rather, instructions may cross multiple blocks.

To better appreciate this problem, consider the scenarios of instruction sequence storage in cache blocks as illustrated in FIG. 7. Assume that each instruction sequence terminates at a branch instruction, which when executed is taken. (Other branch instructions which are not taken may also be contained within the instruction sequence.) Blocks 10 and 12, corresponding to cache block addresses n and n+1, illustrate the situation where the instruction sequence begins in block n but does not terminate in either block n or n+1. In other words, while the instruction sequence begins in block n, it continues beyond block n+1. No branches are predicted to be taken in blocks n or n+1. Blocks 14 and 16 illustrate the situation where the instruction sequence begins in block n and ends in block n+1, where the branch instruction is entirely contained in block n+1. Blocks 18 and 20 illustrate the situation where the instruction sequence begins in block n and ends on a branch instruction occupying one or more data words at the end of block n and one or more data words at the beginning of block n+1. In this situation, the branch instruction that terminates the instruction sequence is said to "cross multiple cache blocks." Finally, blocks 22 and 24 illustrate the situation where the instruction sequence begins on block n and ends at a branch instruction contained entirely within block n.

It is an object of the present invention to perform branch prediction for variable length instructions in the prefetch stage.

It is another object of the invention to accommodate searching for branch instructions which may cross multiple cache blocks and retrieving such branch instructions.

It is yet another object of the invention to efficiently pack instructions of multiple sequences end to end without any gaps in a processor which performs branch prediction in the prefetch stage.

It is an additional object of the invention to provide branch prediction in a processor without impeding the superscalar (parallel) processing capabilities of the processor and to increase the number of data words examined in forming a branch prediction.

SUMMARY OF THE INVENTION

These and other objects are achieved according to the present invention. According to the invention, a processor has a fetcher, branch target buffer and packet unit. These units are configured so as to cooperate with each other, and with the instruction cache, decoding stage and execution stage, to achieve the above noted objects.

According to one embodiment, a branch target buffer is provided with a tag RAM. The tag RAM is organized in a set associative fashion. That is, the addresses of the data words that make up the instructions are organized into sets. Illustratively, all of the addresses in a single cache block are organized into the same set while two addresses in adjacent cache blocks are organized into different sets. Each address is divided into at least a tag portion and a set portion, wherein the set portion indicates the set to which the address belongs. The tag RAM has at least one entry for each set. Each entry can store information for a branch instruction that begins on an address that belongs to the corresponding set. In particular, each entry can store at least the tag portion of the address of the data word on which the branch instruction begins and branch history data regarding the "takeness" of the branch instruction. The branch target buffer has a decoder which receives a search address. In response, the decoder retrieves a first block assigned to a first set corresponding to the set portion of the search address. The decoder also retrieves a second block assigned to a set following the first set. Circuitry is provided for simultaneously comparing a tag address portion contained in each entry of the first and second retrieved blocks to the tag portion of the search address. Based on these comparisons, the circuitry identifies the entry of the first or second block containing information regarding the branch instruction that is predicted to be taken, if any, having the nearest address to, and which at least equals, the search address.

The search address illustratively is generated by the fetcher. Thus, the branch target buffer searches for a branch instruction predicted to be taken in the cache which branch instruction is contained in the cache block containing the search address, or the immediately following cache block. The identified branch instruction may be stored at the search address generated by the prefetcher or an address which follows the search address. Thus, if the cache block has N data words, up to 2·N data words are searched in a cycle.

Illustratively, the branch target buffer also has a data RAM including one entry corresponding to each entry of the tag RAM. Each entry of the data RAM stores a predicted target address to which execution branches (assuming that the corresponding branch instruction is predicted to be taken) and the length of the corresponding branch instruction. When the entry containing the next branch instruction predicted to be taken is identified by the circuitry, the target address and branch instruction length stored in the corresponding entry of the data RAM are retrieved.

Illustratively, branch prediction information can be updated from the actual branch results produced by the execution stage. When the execution stage executes a branch instruction and the branch thereof is taken, the execution unit outputs the length of the branch instruction, the address of the branch instruction (current count of the program counter) and the actual branch address to which execution branched. The decoder of the branch target buffer identifies a block of the tag RAM assigned to a set that matches a set portion of the branch instruction address. The tag portion and prediction information are then stored in an entry of the identified block. If an entry already exists containing a tag address portion that matches the tag portion of the branch instruction address, the updated information is stored in this entry. Furthermore, the actual branch address and the length of the branch instruction are stored in an entry of the data RAM corresponding to the entry of the tag RAM in which the tag address portion is stored.

The packet unit packs one or more variable length sequences of instructions into a sequence of fixed length blocks. Each instruction sequence is contained in a contiguous sequence of data words of a contiguous sequence of one or more cache blocks. The packet unit illustratively has a queue configured to store a plurality of blocks. A contiguous sequence of blocks that contain an instruction sequence are stored in contiguous and sequential adjacent entries of the queue. In addition to storing a cache block, each entry of the queue can store a first indication that indicates whether or not the cache block contains the initial data word of an instruction sequence. If so, the queue entry also stores a first offset indicating which data word of the cache block is the initial data word of the instruction sequence. Each queue entry can also store a second indication that indicates whether or not the cache block contains the last data word of an instruction sequence. The queue entry also stores a second offset indicating which data word of the cache block is the last data word of the instruction sequence. A multiplexer, starting point register and aligner (e.g., funnel shifter) illustratively are also provided. The starting point register receives the first indication and the first offset of the head block. The multiplexer receives the second indication and the second offset of the head block and the second offset of the following block. The aligner receives the head block at a head of the queue, a following block that follows the head block, the output selected by the multiplexer and the contents of the starting point register. In response, the aligner sequentially concatenates the data words of each sequence of instructions to form a contiguous subsequence of data words for each sequence of instructions.

For instance, suppose the first indication of the head block indicates that the head block contains an initial data word of an instruction sequence. In such a case, the starting point register is enabled to output the first offset of the head block to the aligner. In response, the aligner forms an output sequence from at least a sequence of data words of the head block, beginning with the initial data word as indicated by the first offset. In a second example, suppose that the second indication of the head block indicates that the head block contains a final data word of the instruction sequence. In such a case, the multiplexer selects the second offset of the head block for output to the aligner. In response, the aligner ends the sequence of data words used to form the output sequence with the final data word of the head block indicated by the second offset of the head block. (Illustratively, padding data words may be provided beyond the ending data word to form a fixed length output block.) In a third example, suppose that the second indication of the head block indicates that the head block does not contain the final data word of the instruction sequence. In such a case, the multiplexer selects the second offset contained in the following block for output to the aligner. In response, the aligner concatenates to the output sequence of data words a sequence of data words from the following block, beginning with a first data word of the following block but not including data words beyond the offset indicated in the following block.

The fetcher includes fetch address (FA) selection circuitry, search address (SA) selection circuitry, an adder that produces an address that can be selected as the FA and control circuitry for selecting FA and SA. The fetch address selection circuitry outputs a FA to an instruction cache for fetching a block of sequential data words including a data word specified by FA. The search address selection circuitry outputs a SA that equals FA, to a branch target buffer to determine if a branch instruction begins in a block on or after address SA=FA. The control circuitry receives from the branch target buffer an indication of whether or not a taken branch instruction is predicted to begin in a block on or after SA=FA. A predicted address (PA) of a data word on which the predicted branch instruction begins, and a length (LEN) of the predicted branch instruction are received at the adder which produces their sum. A target address (TA) to which execution is predicted to branch is received at the fetch address and search address selection circuits. If the control circuitry receives an indication that a taken branch is predicted to begin in a block on or after SA=FA, the control circuitry determines if the predicted branch instruction is not entirely contained in one of the fetched blocks (e.g., from the sum address produced by the adder). If the predicted branch instruction crosses multiple cache blocks, the control circuitry causes the fetch address circuit to output to the instruction cache as the FA the cache block address that follows the last fetched cache block. The control circuitry furthermore causes the search address selection circuit to output to the branch target buffer the same SA as was done on the previous cycle.

Thus, when a branch instruction is predicted to be taken and the branch instruction crosses multiple cache blocks, the fetch address and the search address are not the same. Rather, the fetch address is incremented to the address of the next immediately following cache block containing the remainder of the branch instruction so as to fetch the remainder of the branch instruction. The search address is maintained at its previous value to ensure that a subsequently occurring branch instruction is not searched for.

Illustratively, if the branch prediction results in predicting that a taken branch instruction is predicted to end in the most recently fetched block corresponding to FA—PA+LEN, the control circuit outputs to the packet unit a first indication that the fetched block corresponding to FA=PA+LEN contains a final data word of an instruction sequence. The control circuit also outputs an offset portion of the address FA=PA+LEN as an offset within the block corresponding to FA=PA+LEN indicating the final data word of the instruction sequence. The control circuit illustratively also causes the fetch address selection circuit to output FA=TA to the instruction cache and the search address selection circuit to output SA=TA to the branch target buffer. The control circuit also illustratively outputs to the packet unit a second indication that the fetched block corresponding to FA=TA contains a beginning of an instruction sequence. The control circuit furthermore outputs an offset portion of TA as an offset within the block corresponding to FA=TA of an initial data word of the instruction sequence.

In short, a processor architecture is provided which predicts multiple branch instructions per cycle and can accommodate predicting branch instructions that cross multiple cache blocks. Thus, efficient branch prediction is provided for a superscalar CISC architecture processor which does not suppress the parallel pipelining of the superscalar processor.

BRIEF DESCRIPTION OF THE DRAWING

FIG. 4 illustrates variable pipeline processing in the processor if FIG. 3.

DETAILED DESCRIPTION OF THE INVENTION

Figure 1:
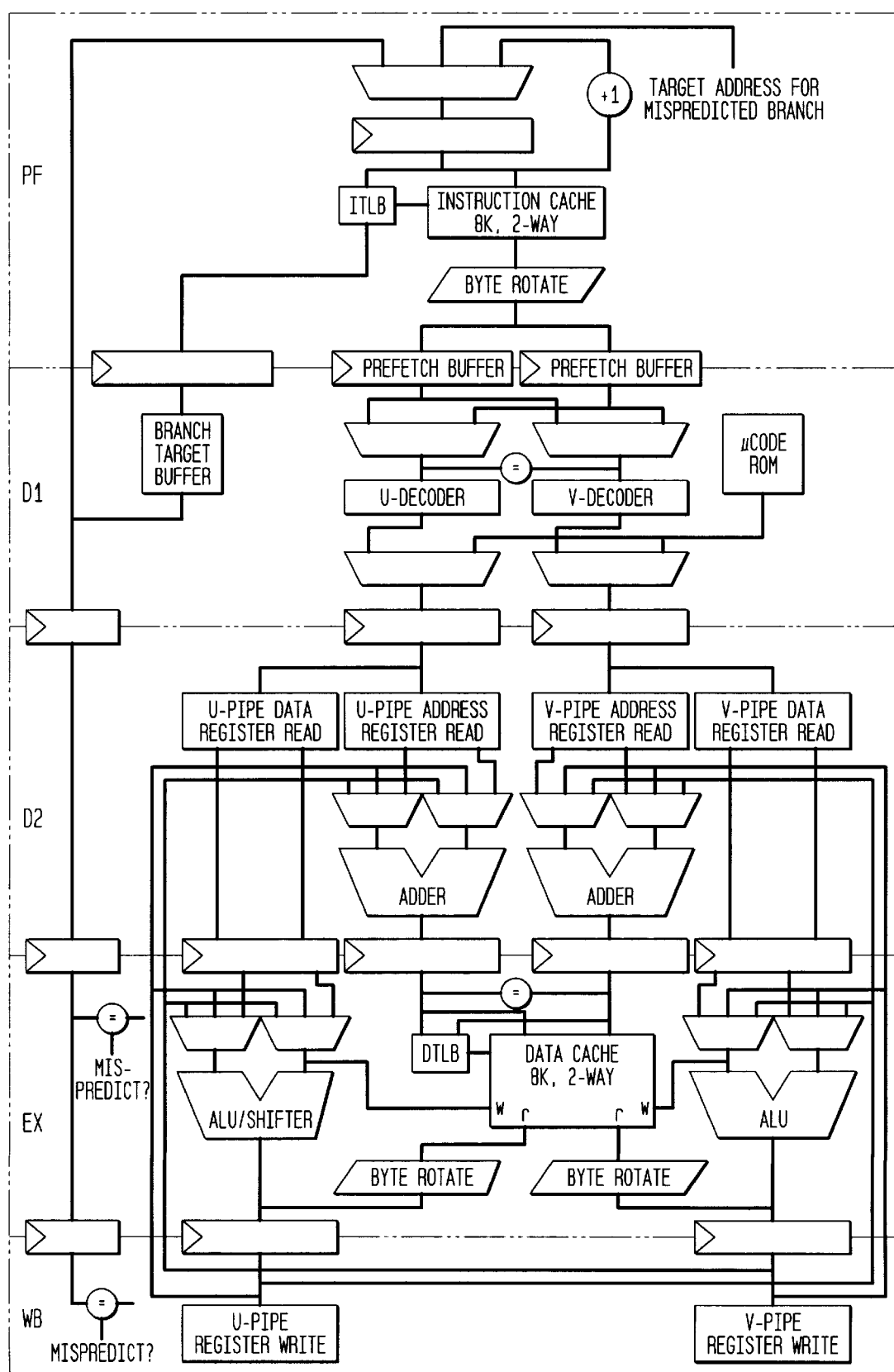
FIG. 1 shows a first conventional processor.
Figure 2:
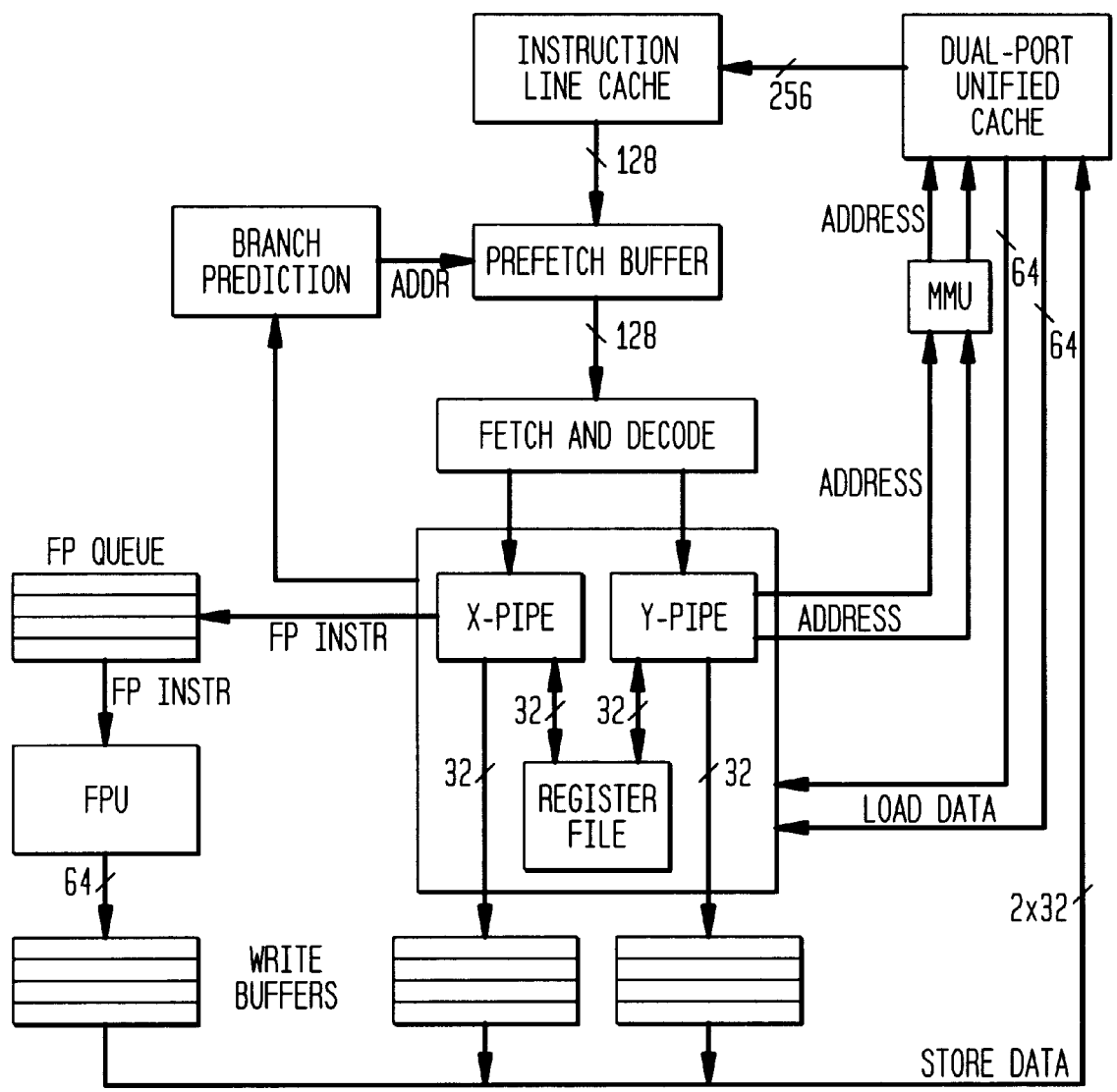
FIG. 2 shows a second conventional processor.
Figure 3:
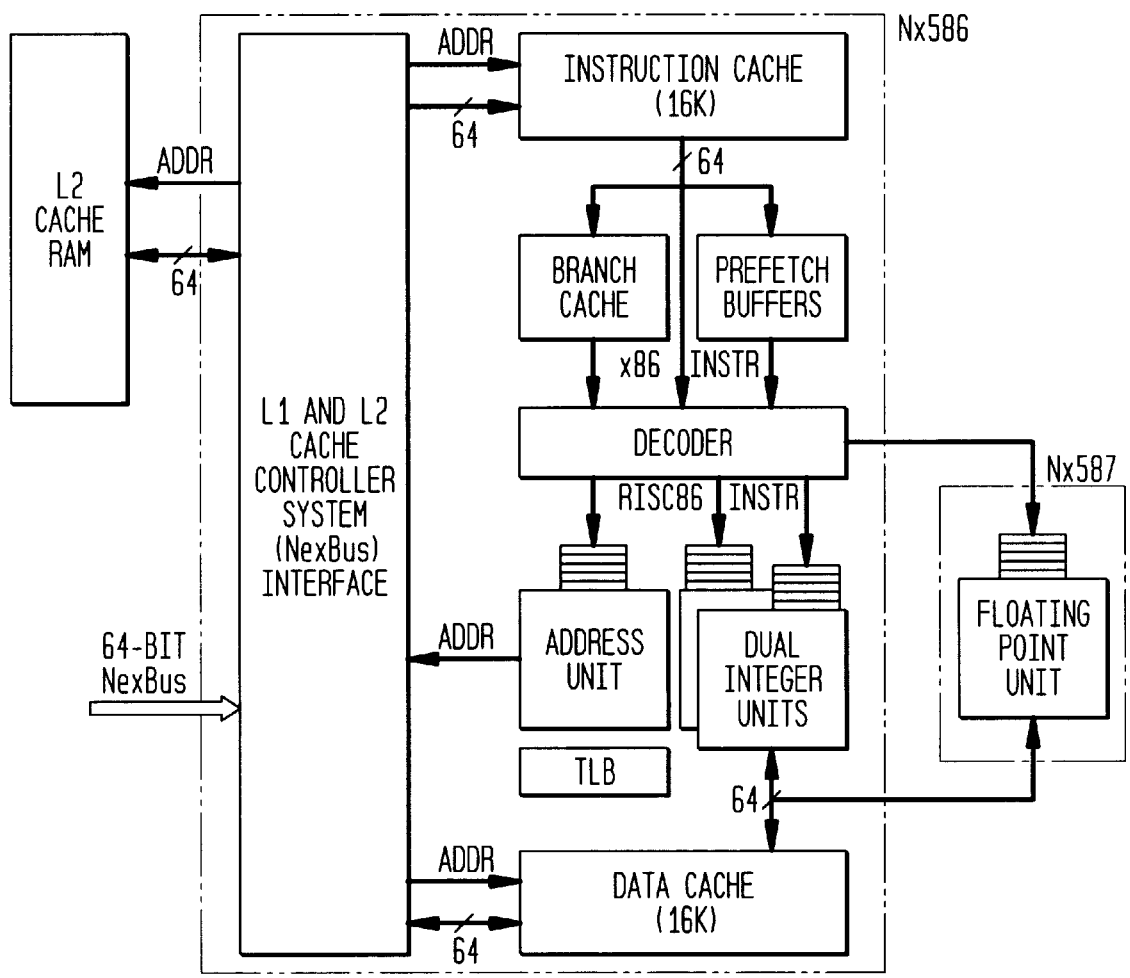
FIG. 3 shows a third conventional processor.
Figure 5:
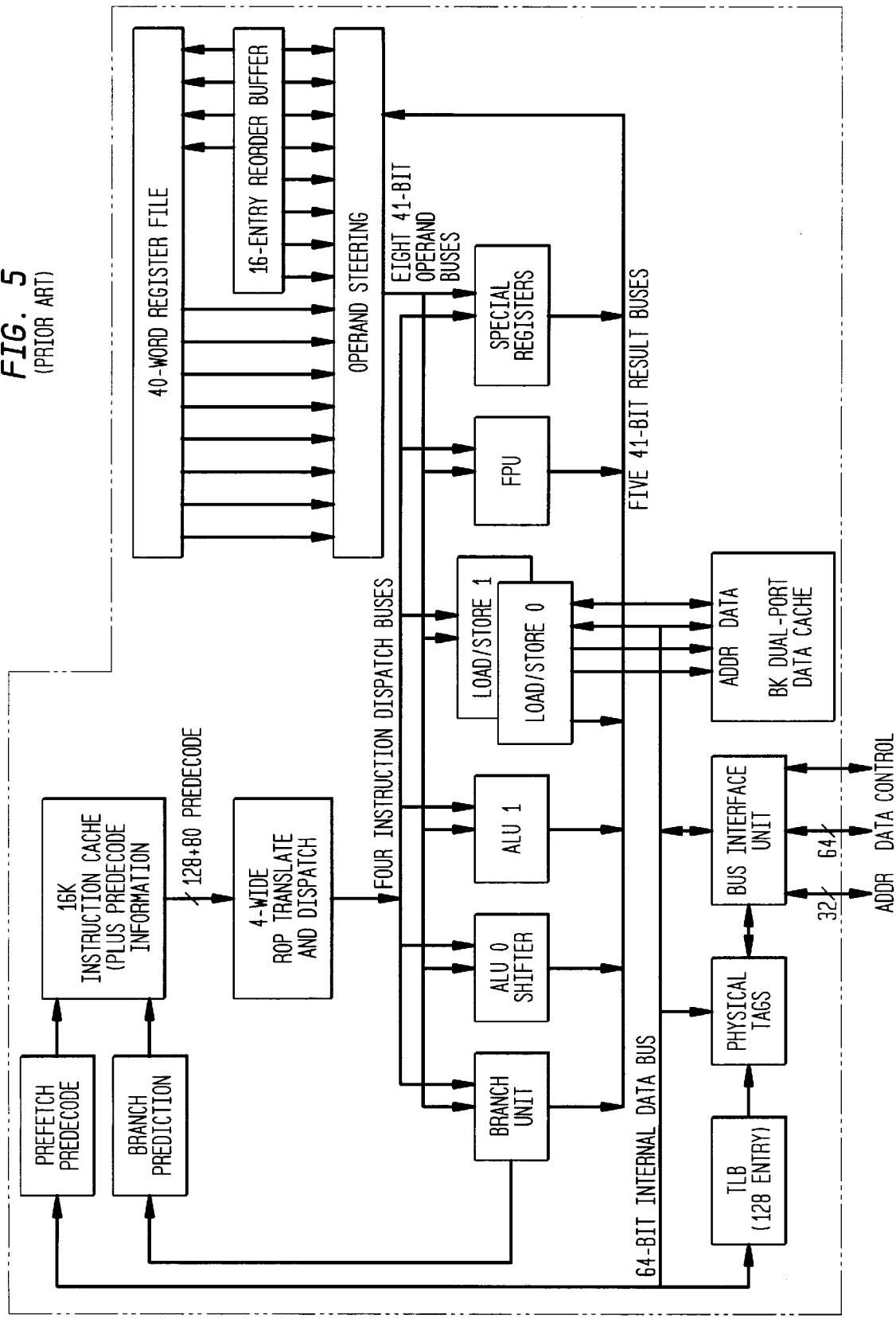
FIG. 5 shows a fourth conventional processor.
Figure 6:
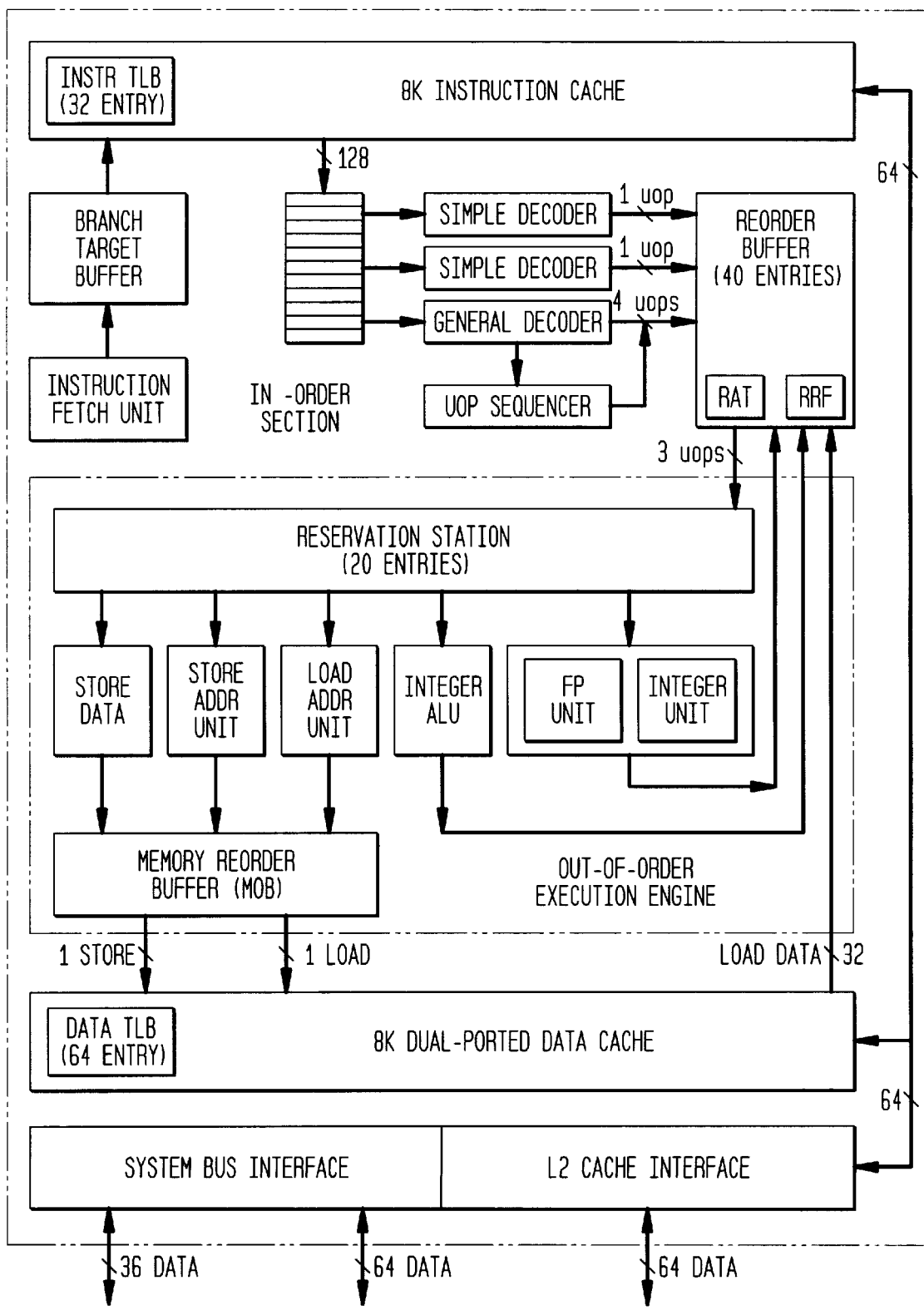
FIG. 6 shows a fifth conventional processor.
Figure 7:
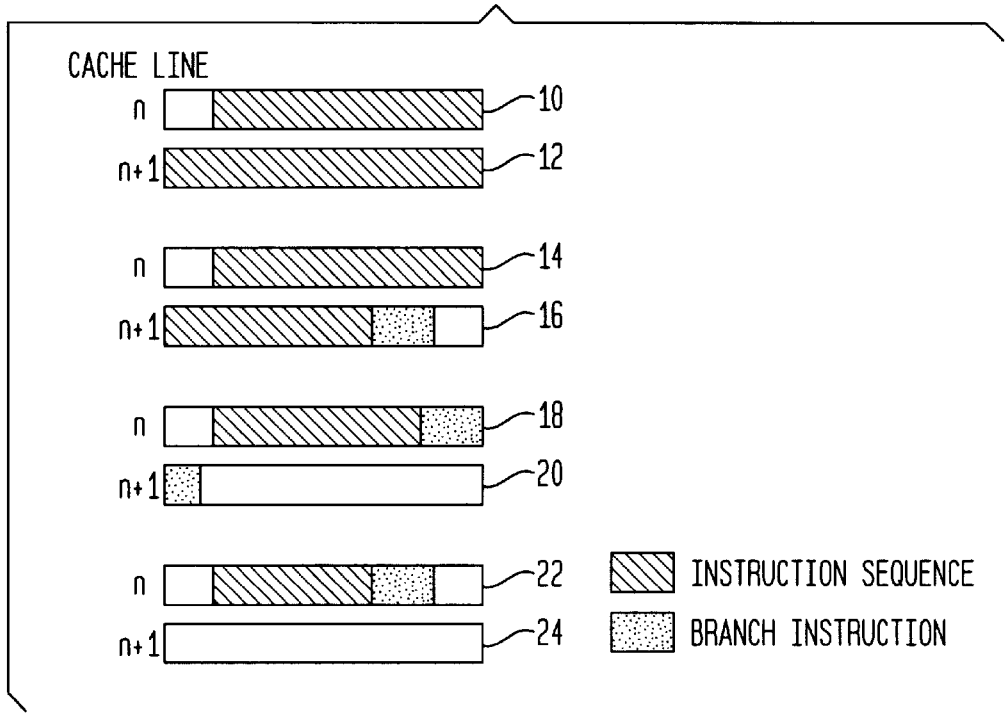
FIG. 7 illustrates the problems associated with branch prediction in CISC architecture processors.
Figure 8:
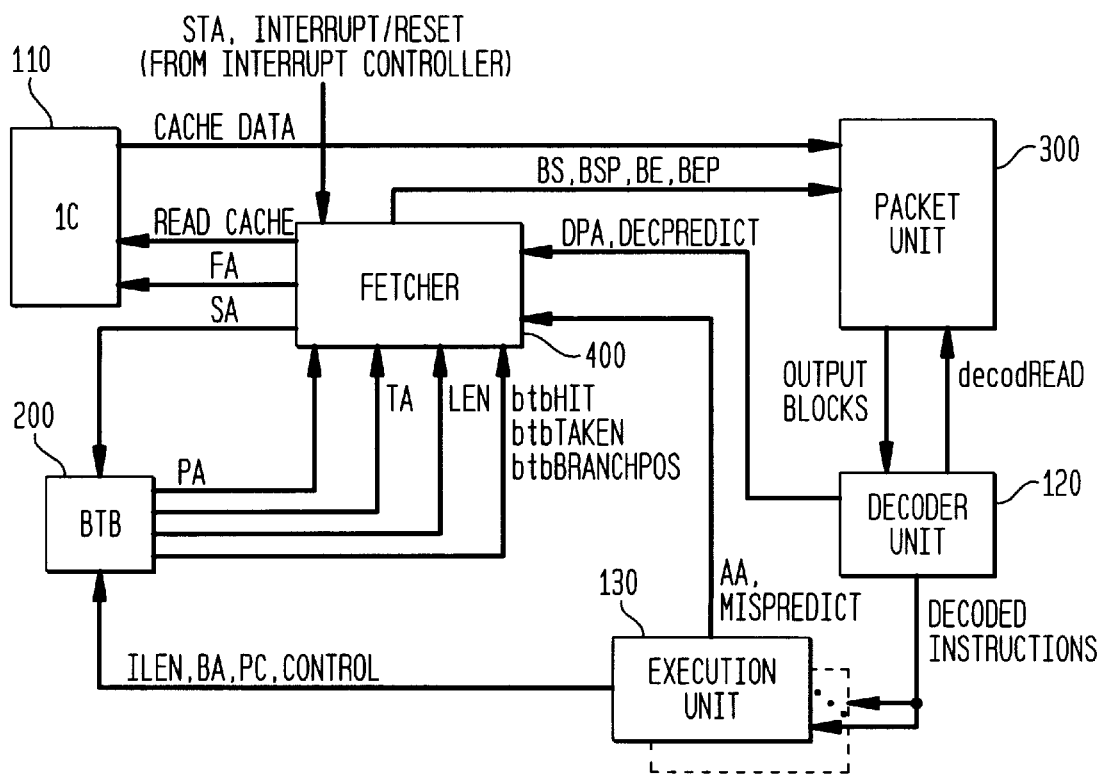
FIG. 8 shows a processor architecture according to an embodiment of the present invention.

FIG. 8 depicts an overview of part of the circuitry of a processor 100 according to an embodiment of the present invention. As shown, the processor includes and instruction cache 110, a decoder 120, an execution unit 130, a branch target buffer 200, a packet unit 300 and a fetcher 400. The instruction cache 110 outputs a sequence of one or more cache blocks, beginning with a cache block containing a data word stored at the fetch address (FA) received from the fetcher 400. The packet unit 300 receives the cache blocks from the instruction cache 110, and the starting data word pointer (BSP), final data word pointer (BEP) and starting and final data word indications (BS and BE, respectively) from the fetcher 400. In response, the packet unit 300 outputs to the decoder 120 output blocks containing aligned and packed sequences of data words of instructions for each instruction sequence. The decoder 120 decodes instructions from the packed sequences of data words and outputs the instructions to one or more execution units 130 in parallel. In addition, the decoder 120 may output a decoded predicted branch address (DPA) of an branch instruction for which the decoder has formed a branch prediction. Such a decoder level prediction may be performed to supplement branch prediction made by the branch target buffer 200. A number of techniques may be used such as the technique described in U.S. Pat. No. 5,353,421.

The execution unit(s) 130 execute(s) the decoded instruction(s). In the course of executing an instruction, a branch instruction may be executed resulting in a branch being taken or not taken. Whichever the case may be, the result may be different from the result predicted by the branch target buffer 200 (i.e., in actual execution, the branch is taken but predicted not to be taken, or, in actual execution, the branch is not taken but predicted not to be taken). When the result of executing the branch instruction is different from the predicted result, branch recovery steps take place including the execution unit 130 outputting to the fetcher 400 an actual address (AA) of the next instruction which should be executed following the branch instruction.

In addition, regardless of whether the branch instruction is correctly predicted or mis-predicted, the execution unit 130 illustratively provides branch history information to the branch target buffer 200. Whenever a branch instruction is executed, the execution unit 130 outputs to the branch target buffer 200, the current count of the program counter (PC) (which is also the branch instruction address), the address to which execution branched or "branch address" (BA) and the actual length of the branch instruction (ILEN).

During instruction execution, the fetcher 400 outputs a FA to the instruction cache and a search address (SA) to the branch target buffer 200. Usually FA is the same as SA except as described below. In response, the branch target buffer 200 performs branch prediction on the cache block containing SA and the cache block which immediately follows that block. This may result in making a prediction that a branch instruction stored at a predicted address (PA), equal to SA, or some following address up to 2·N−1 data words away from SA, will be taken when executed. In response to such a prediction, the branch target buffer 200 outputs the PA, the target address (TA) to which execution is predicted to branch and the predicted length of the branch instruction (LEN) to the fetcher 400. This causes the fetcher 400 to alter the FA and SA. In particular, if, from the PA and the LEN, the fetcher 400 determines that the branch instruction predicted to be taken is entirely contained in the cache block also containing the last FA, then both FA and SA are set equal to TA. This causes the instruction cache 110 to fetch the cache block containing the TA and the branch target buffer to once again resume its normal search for branch instructions in cache blocks fetched from the instruction cache 110.

On the other hand, if the predicted branch instruction is predicted to cross multiple cache blocks, then SA is kept constant and FA is incremented by one cache block address. This causes the branch prediction to be repeated and the very next cache block (containing the trailing portion of the predicted branch instruction) to be fetched from the instruction cache 110.

In addition to modifying FA and SA in response to a prediction, the fetcher may modify FA and SA to both equal DPA or AA. The former case is an example of the decoder 120 overriding a prediction made by the branch target buffer 200. The latter case is an example of the execution unit 130 correcting a mis-prediction made by the branch target buffer 200 (or decoder 120).

In addition to outputting FA to the instruction cache 110, the fetcher 400 simultaneously outputs an offset of FA to the packet unit 300. In addition, an indicator may be outputted to indicate that the cache block containing FA contains the starting data word of an instruction sequence. If so, the offset portion of FA pointing to the starting data word (BSP), and an indication (BS) are stored with the cache block in a queue entry of the packet unit 300. Likewise, in the event that the fetched cache block contains a final data word of an instruction sequence, the fetcher 400 outputs an indicator of this condition (BE) and the offset of the sum of PA and LEN (as BEP). In response, the packet unit 300 stores the indicator BE and offset pointing to the final data word of the instruction sequence BEP along with the fetched cache block in a queue entry of the packet unit 300. If the cache block does not contain a final data word of an instruction sequence, a default maximum offset BEP is nevertheless stored in the queue entry (but not the indication BE).

The following advantages are obtained using the above architecture:

(1) The branch target buffer 200 searches two cache blocks simultaneously, and searches all possible branch instructions for which information is stored in the branch target buffer for these two cache blocks. Thus, if the cache block contains N data words, up to 2·N data words of a fetched cache block and the very next cache block are searched per cycle.

(2) The branch target buffer 200 stores the length of the predicted branch instruction which is provided to the fetcher 400. If the PA is in the cache block corresponding to the FA but the sum of the PA and LEN (which sum is the address of the final data word of the predicted branch instruction) are in a different (i.e., the very next) cache block then the predicted branch instruction crosses multiple cache blocks. In this case, the fetcher outputs the same SA to the branch target buffer so that it repeats this prediction. However, the fetcher outputs as the FA the address in the very next cache block. Thus, the fetcher accommodates branch instructions that cross multiple cache blocks prior to packing the data words of the instruction sequences in the packet unit.

(3) The packet unit 300 is provided instruction sequence boundary information (i.e., a pointer or offset to the starting data word or final data word of an instruction sequence) which is stored with corresponding cache blocks in the queue pending packing by the packet unit 300. Such boundary information assists in concatenating the data words of the fetched cache blocks together to form contiguous sequences of data words for each instruction sequence.

Below, the architecture of the branch target buffer 200, packet unit 300 and fetcher 400 are described separately.

Branch Target Buffer

Figure 9:
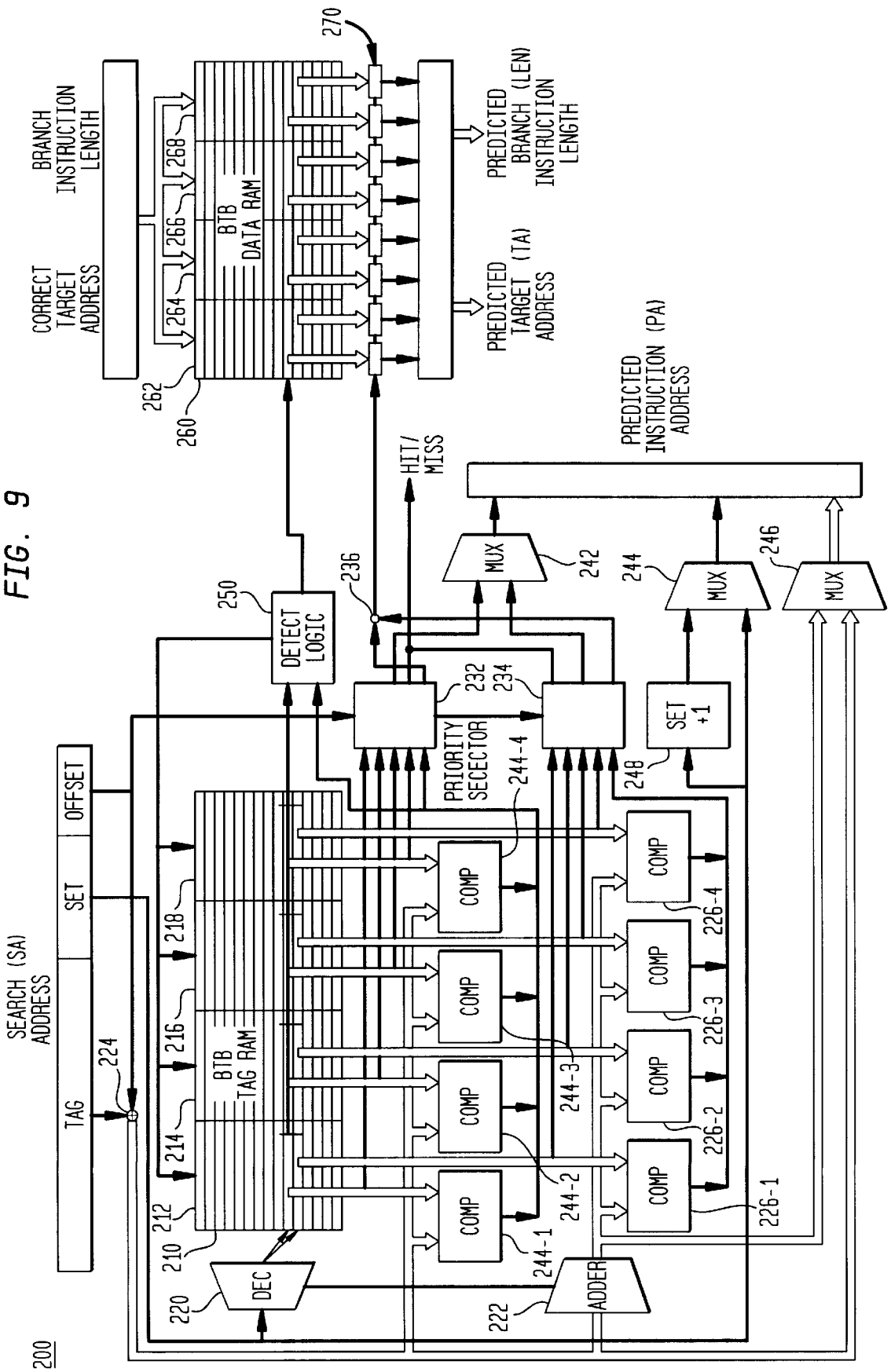
FIG. 9 shows a branch target buffer according to an embodiment of the present invention.

FIG. 9 shows the branch target buffer 200 in greater detail. The branch target buffer 200 includes a tag RAM 210 and a data RAM 260. Illustratively, both the tag RAM 210 and the data RAM 260 are organized in an n-way set associative fashion. In the illustration of FIG. 9, the tag RAM 210 and data RAM 260 are 4-way set associative meaning that for each set, the tag RAM 210 has four entries 212, 214, 216 and 218 and the data RAM 260 has four entries 262, 264, 266 and 268. Illustratively, each address of each data word is partitioned into a tag portion, a set portion and an offset portion. Illustratively, data words in the same cache block are in the same set but have different offsets indicating their location within the cache block. On the other hand, data words in adjacent cache blocks are organized into adjacent sets (wherein the set corresponding to the lowest set number, e.g., 00, is adjacent to the set corresponding to the highest set number, e.g., FF). If each data word is a byte long, and each cache block contains 16 bytes then the offset portion is four bits long. All of the entries 212–218 of the tag RAM 210 corresponding to a particular set are referred to herein as a block (which should not be confused with a cache block). Likewise, a block of the data RAM 260 includes each entry 262–268 corresponding to a single set.

Figure 10:
FIG. 10 shows the organization of each tag RAM entry.

Each entry in the tag RAM 210 illustratively has the fields indicated in FIG. 10. In particular, each entry has a validity indicator field which can be one bit long and which indicates whether or not valid information is contained in the entry. During a power-on reset, the validity bits of each entry are cleared indicating that the contents of the entry are blank and that the entry is available for storing information. When a new branch instruction is identified and predicted to be taken, the validity bit is set to indicate that the entry contains valid information. The tag and offset portions of the address of the branch instruction are stored in the tag and offset fields of the entry. In addition, prediction information, such as a two bit counter that indicates the recent "takeness" of the branch, may be stored in the prediction information field. Finally, replacement information, such as the frequency of access of the entry may be stored in the replacement information field (e.g., in accordance with a "least recently used" replacement technique).

Figure 11:
FIG. 11 shows the organization of each data RAM entry.

Each entry of the data RAM 260 only has two fields as shown in FIG. 11. As described in greater detail below, the target address field stores the TA to which execution is predicted to branch when a corresponding branch instruction is executed. The branch instruction length field stores the LEN (length) of the corresponding branch instruction.

A decoder 220 is provided which receives the set portion of an inputted SA (or PC). In response, the decoder 220 simultaneously retrieves the contents of a block of the tag RAM 210 corresponding to the set indicated by the set portion of the inputted SA (or PC). The tag portion of each entry of the retrieved block is outputted in parallel to a corresponding comparator (e.g., the comparators 224-1, 224-2, 224-3 or 224-4). The tag and offset of each entry of the retrieved block are also outputted in parallel to a priority decoder 232. In addition, the decoder 220 retrieves the "next" block corresponding to the very next set or set that follows the set indicated by the set portion of the inputted SA. Likewise, the tags stored in each entry of the next block are outputted in parallel to a corresponding comparator (e.g., the comparators 226-1, 226-2, 226-3 or 226-4) and the tag and offset of each entry of the next block are outputted in parallel to a priority decoder 234. The tag portion of the inputted SA (or PC) is outputted as a second input to each comparator 224-1 to 224-4 and 226-1 to 226-4. An adder 222 is provided in the case that the SA is near a "page boundary" of the addresses. That is, assume the cache blocks are numbered 0000–FFFF wherein the first two hexadecimal digits are the tag portion of the address and the last two hexadecimal digits are the set portion of the address. If the SA has a tag portion of 01 and a set portion of FF then the corresponding block will correspond to set FF (i.e., cache block 01FF with tag 01) and the next block will correspond to set 00 (i.e., cache block 0200 with tag 02). In this event, the decoder 210 outputs a signal to adder 222 to cause adder 222 to increment the tag portion of the SA used in the comparators 226-1 to 226-4. The comparators 224-1 to 224-4 and 226-1 to 226-4 simultaneously compare the tag portion of the SA (or the incremented tag portion of SA) to the tag stored in the corresponding retrieved entry of a retrieved block. Each comparator 224-1 to 224-4 or 226-1 to 226-4 that determines it has a matching entry (in this case, an entry with a tag that equals the tag portion of the SA, or SA+1, with which it is compared) outputs a hit or miss signal to its respective priority decoder 232 or 234. Note that if the valid bit of the entry received by the comparator 224-1 to 224-4 or 226-1 to 226-4 is cleared, indicating that the entry is invalid, a miss signal is automatically generated regardless of the result of the comparison.

Each priority decoder 232 and 234 receives the hit/miss signals from its respective comparators 224-1 to 224-4 or 226-1 to 226-4 and the tags and offsets corresponding to each hit/miss signal from the tag RAM 210. The priority decoders 232 and 234 also receive the offset portion of the SA. In response, the priority decoder 232 compares the offset portion of the SA to the offset (outputted from the tag RAM 210) for which a hit signal was received from a comparator 224-1 to 224-4 or 226-1 to 226-4. Any offsets that are less than the offset portion of the SA cannot be selected and are ignored by the priority decoder 232. (The reason for this is to prevent predicting a branch instruction that precedes the SA, which branch instruction would not be executed during normal sequential instruction execution.) Furthermore, the priority decoders 232 and 234 ignore the offsets (outputted from the tag RAM 210) for which comparators 224-1 to 224-4 and 226-1 to 226-4 output a miss signal. Despite removing many outputs of the comparators 224-1 to 224-4 and 226-1 to 226-4 from consideration, it is still possible that several offsets remain and can be selected as the prediction result. As such, the priority decoders 232 and 234 prioritize amongst the remaining offsets in ascending order and output the smallest offset. Furthermore, if the priority decoder 232 has an offset for output, the priority decoder 232 outputs a disabling signal to the priority decoder 234 to prevent the priority decoder 234 from outputting its offset. This is because the priority decoder 232 processes predicted branch instructions located in a cache block that precedes the cache block containing the predicted branch instructions processed by the priority decoder 234. If the priority decoder 232 has an offset to output, by virtue of the organization of the tag RAM 210, it must correspond to a branch instruction that sequentially precedes any branch instruction having an offset prioritized by the priority decoder 234. On the other hand, if the priority decoder 232 has no offset to output, then the priority decoder 232 outputs an enabling signal which enables the priority decoder 234 to output its offset.

The offsets outputted by the priority decoders 232 and 234 are received at a multiplexer 242. The set portion of the SA is inputted as one input to a multiplexer 244 and inputted to an incrementer 248 which adds one to the set portion of the SA. The output of the incrementer 248 is inputted as a second input to the multiplexer 244. The tag portion of the SA is inputted as one input to a multiplexer 246 and the output of the adder 222 is inputted as a second input to the multiplexer 246. The same disabling/enabling signal outputted by the priority decoder 232 to the priority decoder 234 may be inputted as a selection control input to the multiplexers 242, 244 and 246. When the priority decoder 232 disables the priority decoder 234, the multiplexers 242, 244 and 246 select the offset outputted by the priority decoder 232, the set portion of SA and the tag portion of SA, respectively. When the priority decoder 234 enables the priority decoder 234, the multiplexers 242, 244 and 246 select the offset outputted by the priority decoder 234, the set portion SA+1 produced by the incrementer 248 and the tag portion of SA as (possibly incremented and) outputted by the adder 222. The outputs of the multiplexers 242, 244 and 246 form the offset, set and tag portions, respectively, of the PA.

Meanwhile, the decoder 220 causes the data RAM 260 to retrieve the contents of each entry corresponding to the two blocks of the tag RAM 210 retrieved and transferred to the priority encoders 232 and 234 and the comparators 224-1 to 224-4 and 226-1 to 226-4. Control signals produced by the priority decoders 232 and 234 are sent (via combiner 236) to output selection circuits 270. The control signals indicate which of the retrieved entries of the data RAM 260 correspond to the entry of the tag RAM 210 having the offset that was selected by the priority decoders 232 and 234 (note that only one priority decoder 232 or 234 is enabled to output a control signal). Thus, the control signals cause the output selector signal 270 to select for output the contents of the retrieved data RAM 260 entry corresponding to the entry of the tag RAM selected by the priority decoders 232 and 234. As a result, the TA and branch instruction length (LEN) contained in a data RAM 260 entry corresponding to the entry of the tag RAM 210 selected by the priority decoders 232 and 234 are selected for output.

In addition, the priority decoders 232 and 234 output a btbTAKEN signal indicating whether or not any branch has been predicted to be taken for the inputted SA. The btbTAKEN signal can be generated simply as a logical OR of the signals outputted by combiner 236. The priority decoders 232 and 234 can also output a btbHIT signal indicating whether or not the tag RAM 210 contains prediction information for a branch instruction stored at of after SA, whether or not any such branch instruction is predicted to be taken.

The above discussion describes how the branch target buffer 200 circuitry of FIG. 9 operates to perform a search and branch prediction given a SA to retrieve a PA, TA and LEN of the next branch instruction predicted to be taken. The circuitry of FIG. 9 also operates to update the branch prediction information in response to a branch instruction predicted by the decoder unit 120 (FIG. 8) or execution of a branch instruction in the execution unit 130 (FIG. 8). Assume that in either case, the PC (address of the branch instruction), ILEN (length of the branch instruction) and BA (branch address, to which execution branched, or is predicted to branch) are inputted to the branch target buffer 200. In this case, it is desirable to locate only the single entry of the tag RAM 210 corresponding to the PC (an thus corresponding to this exact branch instruction for which updated branch information is to be stored), if any exists. If no such entry exists, the one entry must be selected for storing the updated branch information. As before, the set portion of the PC is inputted to the decoder 220 which retrieves only the block corresponding to the same set as the PC. The tag and offset portions of the PC are concatenated by combiner 224 and inputted to each comparator 224-1 to 224-4. Both the tag and offset portions of each entry of the retrieved block are inputted to their respective comparators 224-1 to 224-4. The comparators determine if the retrieved tag and offsets of their respective entry matches the tag and offset portions of the PC. If so, then the entry provided to the comparator corresponds to the branch instruction which is to be updated and a hit signal is outputted to detect logic 250. Otherwise, a miss signal is outputted to detect logic 250. As before, it the entry contains a cleared validity bit (indicating that the entry does not contain valid data) the comparator 224-1 to 224-4 outputs a miss signal regardless of the results of the comparison.

The detect logic 250 determines if any hit signal is received. If so, then an entry has already been allocated for storing the updated prediction information. In response, the decision logic 250 activates the appropriate entry of the retrieved block and stores therein the tag portion and offset portion of the PC and new prediction (and replacement) information.

The decision logic 250 also receives the validity and replacement information from each selected entry of the retrieved block. If no comparator 224-1 to 224-4 generates a hit signal, then no entry is currently allocated to this branch instruction. In that case, one of the invalid entries is selected by the decision logic 250 for storing the updated prediction information. If no invalid entries are available, then the decision logic 250 selects one of the entries based on the replacement information retrieved therefrom and overwrites the information stored for in the selected entry. Advantageously, entries containing branches predicted not to be taken are selected to be replaced over entries containing branches predicted to be taken. The decision logic 250 also outputs an appropriate selector signal to the data RAM 260 for selecting an entry therein corresponding to the entry of the tag RAM 210 that was selected for storing the updated prediction information. (Note that, as above, when the decoder 220 selects the block of the tag RAM 210 corresponding to the set portion of the PC, the decoder 220 also selects a corresponding block of the data RAM 260.) The new TA and ILEN are stored in the selected entry of the data RAM 260.

For sake of illustration, consider the instructions of Table 1.

TABLE 1

| cache block | address | instruction | | |
|---|---|---|---|---|
| 0000 | 0x00000 | MOV | AH, | D5H |
|  | 0x00002 | SHAF |  |  |
|  | 0x00003 | JNC | Label_1 |  |
|  | 0x00005 | JNZ | Label_2 |  |
|  | 0x00007 | JNP | Label_3 |  |
|  | 0x00009 | JNS | Label_4 |  |
|  | 0x0000A | LAHF |  |  |
|  | 0x0000B | MOV | CL, | 5 |
|  | 0x0000E | SHR | AH, | CL |
| 0001 | 0x00010 | JNC | Label_5 |  |
|  | 0x00012 | MOV | AL, | 40H |
|  | 0x00014 | SHL | AL, | 1 |
|  | 0x00016 | JNO | Label_6 |  |
|  | 0x00018 | XOR | AH, | AH |

In this list of instructions, there are six branch instructions with branch instruction addresses 0x00003, 0x00005, 0x00007, 0x00009, 0x00010 and 0x00016. Assume that each address is 20 bits long and each cache block contains 16 bytes. Also assume that the tag portion is the 8 most significant bits of each address, the set portion is the next 8 bits (256 different sets) of each address and the offset portion is the least significant 4 bits of each address. The tag RAM 210 may store the above information as shown in Table 2.

TABLE 2

| set | tag | off | x | tag | off | x | tag | off | x | tag | off | x |
|---|---|---|---|---|---|---|---|---|---|---|---|---|
| 00 | 00 | 3 |  | 00 | 5 |  | 00 | 7 |  | 00 | 9 |  |
| 01 | 00 | 0 |  | 00 | 6 |  |  |  |  |  |  |  |
| ... |  |  |  |  |  |  |  |  |  |  |  |  |
| FF |  |  |  |  |  |  |  |  |  |  |  |  |

In Table 2 "x" signifies other information in each entry not considered in this example. Likewise, the data RAM 260 may store the information shown in Table 3.

TABLE 3

| set | TA | LEN | TA | LEN | TA | LEN | TA | LEN |
|---|---|---|---|---|---|---|---|---|
| 00 | Label_1 | 2 | Label_2 | 2 | Label_3 | 2 | Label_4 | 1 |
| 01 | Label_5 | 2 | Label_6 | 2 |  |  |  |  |
| ... |  |  |  |  |  |  |  |  |
| FF |  |  |  |  |  |  |  |  |

Assume that address 0x00002 corresponding to instruction SHAF is inputted as the SA. the decoder 220 retrieves the blocks of the tag RAM 210 corresponding to set 00 and set 01. The comparator 224-1 compares the tag portion 00 of the SA=0x00002 to the tag 00 of the retrieved entry. The comparator 224-2 compares the tag portion 00 of SA to the tag 00 of the retrieved entry. The comparator 224-3 compares the tag portion 00 of SA to the tag 00 of the retrieved entry. The comparator 224-4 compares the tag portion 00 of SA to the tag 00 of the retrieved entry. The comparator 226-1 compares the tag portion 00 of SA to the tag 00 of the retrieved entry. The comparator 226-2 compares the tag portion 00 of SA to the tag 00 of the retrieved entry. The comparators 226-3 and 226-4 are presumed to have invalid entries and therefore automatically generate misses. Assume first that the branches at addresses 0x00003 and 0x00005 are predicted not to be taken but all other branches are predicted to be taken. In such a case, the comparators 224-3, 224-4, 226-1 and 226-2 output hit signals. The priority decoder 232 selects the offset 7 outputted from the tag RAM 210 (corresponding to the address 0x00007, for which the comparator 224-3 produced a "hit" signal) and disables the priority decoder 234. The PA therefore equals the tag=00, the set=00 and the offset=7=0x00007. The decoder 220 causes the data RAM to retrieve the contents of the blocks corresponding to sets 00 and 01. However, the priority decoder 232 selects the TA=Label_3 and LEN=2 corresponding to the entry of the block of set 00 containing the offset=7.

Now assume that SA=0x00009 and that the branches at addresses 0x00003 and 0x00005 are predicted not to be taken but all other branches are predicted to be taken. In such a case, the comparators 224-3, 224-4, 226-1 and 226-2 output hit signals. The priority decoder 232 ignores the offset 7 outputted from the tag RAM 210 (corresponding to the address 0x00007 for which the comparator 224-3 produced a "hit" signal) because it is less than the offset 9 of the SA. Instead, the priority decoder 232 selects the offset 9 (corresponding to the address 0x00009 for which the comparator 224-4 produced a hit signal) and disables the priority decoder 234. The PA therefore equals the tag=00, the set=00 and the offset=9=0x00009. In this case, the priority decoder 232 selects the TA=Label_4 and LEN=1 corresponding to the entry of the block of set 00 containing the offset-9.

Now assume that SA=0x0000A and that the branches at addresses 0x00003 and 0x00005 are predicted not to be taken but all other branches are predicted to be taken. In such a case, the comparators 224-3, 224-4, 226-1 and 226-2 output hit signals. The priority decoder 232 ignores the offset 7 (corresponding to the address 0x00007 for which the comparator 224-3 produced a hit signal) and the offset 9 (corresponding to the address 0x00009 for which the comparator 224-4 produced a hit signal) because they are both less than the offset A of the SA. Instead, the priority decoder 232 enables the priority decoder 234. The priority decoder 234 selects the offset 0 corresponding to the address 0x00010 for which the comparator 226-1 produced a hit signal. The PA therefore equals the tag=00, the set=0i and the offset=0=0x00010. In this case, the priority decoder 234 selects the TA=Label_5 and LEN=2 corresponding to the entry of the block of set 01 containing the offset=0.

Packet Unit

Figure 12:
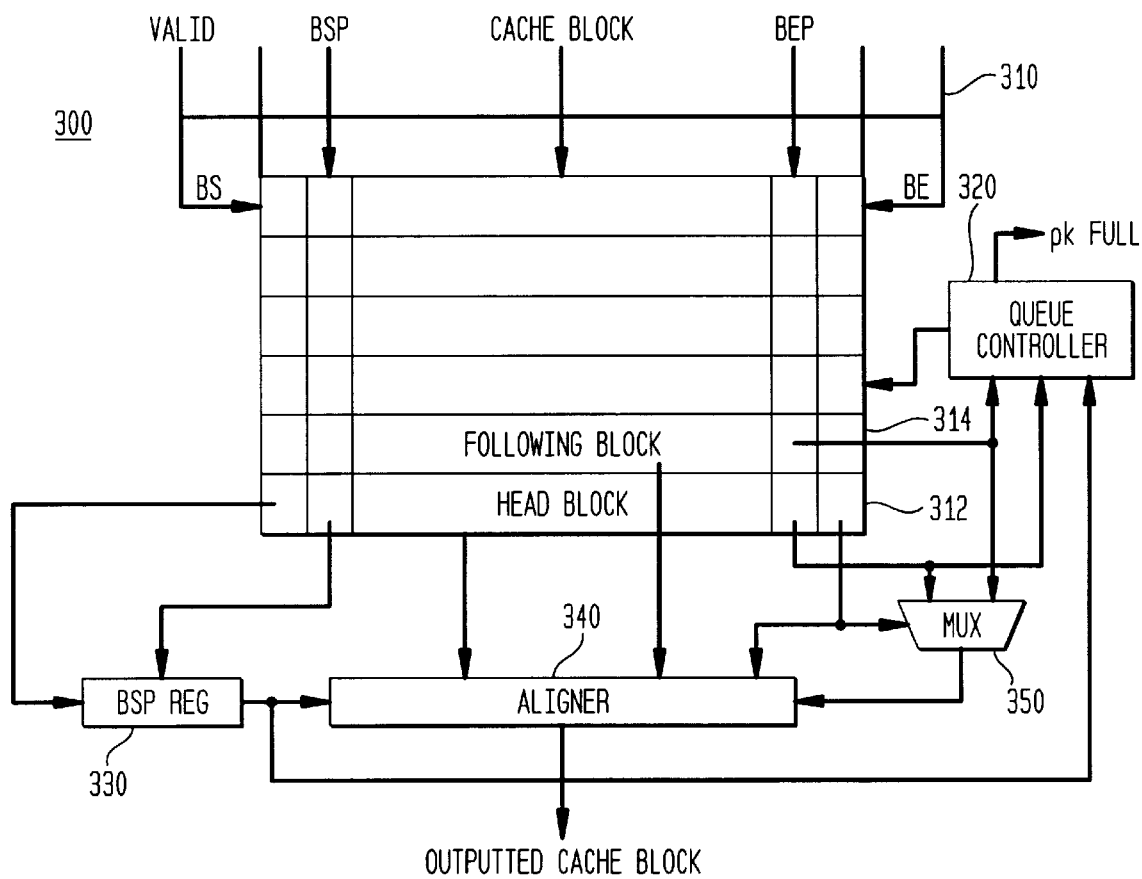
FIG. 12 shows a packet unit according to an embodiment of the present invention.

FIG. 12 shows an illustrative architecture for the packet unit 300. As shown, the packet unit 300 includes a queue 310 with plural queue entries, including head block entry 312 and following block entry 314. The head block entry 312 contains the head block stored in the queue 310 and the following block entry 314 contains the block immediately following the head block in the queue 310. The selection of entries in which information is stored, or from which information is retrieved, is controlled by queue controller 320. As is conventionally known, the queue controller 320 may maintain the head and tail pointers which point to the entry containing the head block 312 and the next blank entry that is available to receive new information, respectively.

A shown, each entry has a field for storing an entire cache block of data (e.g., 16 bytes). Each such cache block is fetched from the instruction cache 110 (FIG. 8) by the fetcher 400 (FIG. 8). In addition, each entry has two indicators BS and BE. The indicator BS indicates whether or not the cache block stored in the same entry contains the starting data word of an instruction sequence. Likewise, the indicator BE indicates whether or not the cache block in the same entry contains the ending or final data word of an instruction sequence. When BS indicates that the cache block contains the starting data word of an instruction sequence, then a value is also stored in a respective BSP field of the entry indicating the offset within the cache block of the starting data word of the instruction sequence. Regardless of whether or not BE is set, a value is stored in a respective BEP field of the entry. When BE is not set, BEP is set to point to the last data word of the cache block. When BE is set, then a value is stored in BEP indicating the offset within the cache block of the final data word in the instruction sequence.

A block starting point register 330 is provided which responds to the BS and BSP fields of the head block entry 312 at the head of the queue 310. If BS is set (indicating that the starting data word of an instruction sequence is contained within the head block stored in head block entry 312), then the register 330 is enabled to store the offset contained in the BSP field of the head block entry 312. Otherwise, no value is stored in the register 330.

A multiplexer 350 is provided which receives as selectable inputs the values stored in the BEP field of the head block entry 312 and the value stored in the BEP field of the following block entry 314. The selection is made depending on whether or not the bit is set in the BE field of the head block entry 312. If set (indicating that the head block contains the final data word of an instruction sequence), the multiplexer 350 selects the value stored in the BEP field of the head block entry 312. If cleared (indicating that the head block does not store a final data word of the instruction sequence), the multiplexer 350 selects the value stored in the BEP field of the following block entry 314.

An aligner 340 is provided for aligning the starting data word of each instruction sequence with the first data word entry of an outputted cache block. Furthermore, the aligner 340 seemlessly concatenates data words of an instruction sequence that originate from different cache blocks into a continuous stream of output cache blocks with no gaps. The aligner 340 may be implemented with a barrel shifter configured as a funnel shifter. Such funnel shifters are well known. The aligner 340 receives the BSP of the head block entry 312 on the same cycle that it is stored in the register 330. Furthermore, the aligner 340 receives the BE bit from the head block entry 312. If it is set, the "window" of data words used to form the output data word includes only data words in the head block entry 312. If the BE bit is cleared, the "window" of data words used to form the output block is a concatenation of the data words in the head block entry 312 followed by data words in the following block entry 314. The BSP value determines the number of data word positions that the window of data words is left-shifted before forming the output block. The BEP received from the multiplexer 350 masks out a number of data words on the right hand side of the window of data words before forming the output block. The output block (now aligned with the shifted window) is then formed by the left-most 16 data words of the window as left shifted and masked.

The operation of the packet unit 300 is now described by way of example. Assume that the following list of instructions are contained within fetched cache blocks, which cache blocks have 16 bit addresses and contain 16 bytes:

| | | |
|---|---|---|
| 0 × 00005 | ADD | R1, R2, R3 |
| . | . | . |
| . | . | . |
| 0 × 00024 | JMP | 0 × 00058 |
| 0 × 00027 | ... | ... |
| . | . | . |
| . | . | . |
| 0 × 00058 | CMP | R1, R2 |
| 0 × 0005C | JMP | 0 × 00075 |
| 0 × 00060 | ... | ... |

Figure 13:
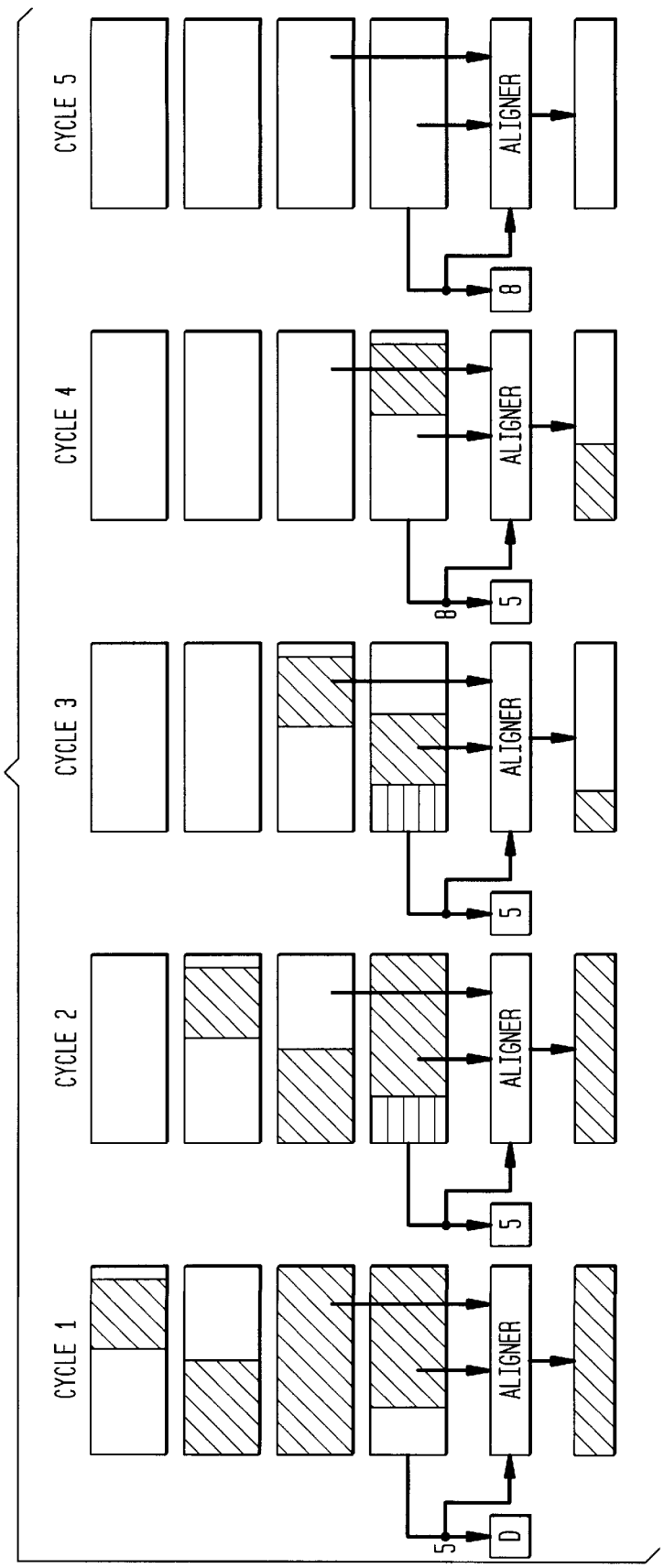
FIG. 13 shows the operation of the packet unit in greater detail.

The storage of the cache blocks within the queue 310 may be as shown in Table 4 and graphically depicted in FIG. 13.

TABLE 4

| Queue entry | BS | BSP | data words | BEP | BE |
|---|---|---|---|---|---|
| | 1 | 8 | 00050-0005F | F | 1 |
| | 0 | 0 | 00020-0002F | 6 | 1 |
| 314 (following) | 0 | 0 | 00010-0001F | F | 0 |
| 312 (head) | 1 | 5 | 00000-0000F | F | 0 |

Initially, the head block entry 312 contains the cache block with data at addresses 0x00000–0x0000F. However, the instruction sequence begins on instruction 0x00005. On cycle 1, the BS bit is received at the register 330 which loads the BSP=5 offset from the head block entry 312. The register 330 outputs the BSP=5 which causes the aligner 340 to left shift the data words in the head block entry 312 five data words (thereby truncating or discarding the data words at addresses 0x00000–0x00004). Furthermore, because the BE bit is cleared, the multiplexer 350 selects the BEP value from the following block entry 314. The BEP field of the following block entry 314 contains the value F. Thus, up to sixteen data words from the following block entry 314 may be concatenated with the data words of the head block entry 312. However, because the output block is only 16 data words long, and the eleven data words at addresses 0x00005–0x0000F are already selected for the output word, only the five data words at addresses 0x00010–0x00014 in the following block entry 314 are concatenated to the data words at addresses 0x00005–0x0000F to form as the output word the sequence of data words at addresses 0x00005–0x0000F, 0x00010–0x00014. The queue controller 320 receives the BSP and BEP values stored in the head block entry 312 and the BEP value stored in the following block entry 314. The queue controller 320 determines that the data words of only one entry, namely, the head block entry 312 have been exhausted. Therefore, the queue controller 320 advances the queue entries only one entry. Afterwards, the queue 310 stores the data as indicated in Table 5.

TABLE 5

| Queue entry | BS | BSP | data words | BEP | BE |
| --- | --- | --- | --- | --- | --- |
|  | 1 | 8 | 00050-0005F | F | 1 |
| 314 (following) | 0 | 0 | 00020-0002F | 6 | 1 |
| 312 (head) | 0 | 0 | 00010-0001F | F | 0 |

Next, on cycle 2, the BS indicator currently stored in the head block is cleared. Thus, the register 330 is maintained at its value of five. This causes the aligner 340 to left shift the block in the head block entry 312 five data words in forming the output block. Thus, data words at addresses 0x00010–0x00014 are truncated. The BE bit of the head block entry is cleared and thus the multiplexer selects the BEP value in the following block entry 314. Thus, the BEP value=6 is outputted to the aligner 340 limiting the number of data words that can be concatenated to the output data word to seven (namely, data words 0 . . . 6). However, only five data words, namely, the data words 0x00020–0x00024, are needed. Thus the aligner 340 forms the output data word 0x00015–0x0001F, 0x00020–0x00024. Again, the queue controller 320 determines that only one cache block, namely, the one currently stored in the head block entry 312 was completely exhausted and advances the stored values one queue entry. Afterwards, the entries in the queue 310 are as depicted in Table 6.

TABLE 6

| Queue entry | BS | BSP | data words | BEP | BE |
| --- | --- | --- | --- | --- | --- |
| 314 (following) | 1 | 8 | 00050-0005F | F | 1 |
| 312 (head) | 0 | 0 | 00020-0002F | 6 | 1 |

Next, on cycle 3, the value in the register 330 is unchanged because the BS bit of the head block entry 312 is cleared. The aligner 340 therefore left shifts the cache block stored in the head block entry 312 five data words thereby truncating the data words 0x00020–0x00024. In this case, however, the BE bit of the head block entry 312 is set. This causes the multiplexer 350 to select the BEP=6 from the head block entry 312. In addition, the set BE bit is received at the aligner 340 which forms the output data word using only data of the head block entry 312. as a result, the output data word is formed with the data words 0x00025–0x00026 followed by fourteen zero valued data words (padding data words). The queue controller 320 again determines that only one block was exhausted this cycle and advances the information only one entry. Afterwards, the entries in the queue 310 are as depicted in Table 7.

TABLE 7

| Queue entry | BS | BSP | data words | BEP | BE |
| --- | --- | --- | --- | --- | --- |
| 312 (head) | 1 | 8 | 00050-0005F | F | 1 |

On cycle 4, the BS bit in the head block entry 312 being set causes the BSP=8 to be stored in the register 330 and outputted to the aligner 340. In response, the aligner 340 left shifts the cache block stored in the head block entry 312 by eight data words, thereby truncating the data words at addresses 0x00050–0x00057. Next, the BE bit being set in the head block entry 312 causes the multiplexer 350 to select the BEP=F from the head block entry 312 and the aligner 340 to form the output block from only the data in the head block entry 312. Thus, the aligner 340 forms the output block as the data words at addresses 0x00058–0x0005F, followed by eight padding data words. Afterwards, the queue 310 is empty as illustrated in cycle 5 of FIG. 13.

In the above processing, it is possible that the data from two cache blocks can be exhausted in a single cycle. For instance, suppose, the branch instruction that ends the first sequence was stored at addresses 0x00021–0x00022. In such a case, the BEP value in Table 5 would have been 2 as opposed to 6. The aligner 340 would have formed the output block as the sequence 0x00015–0x0001F, 0x00020–0x00022 followed by two padding data words. The queue controller would have detected that the BE was cleared for the head block entry 312 but that the BEP for the following block entry 314 was less than the BSP value stored in the register 330. This would have indicated that the data words of two block entries were exhausted and the queue controller 320 would have advanced the queue 310 by two entries.

FIG. 12 shows that the queue controller 320 can also output a signal pkFULL. The purpose of this signal pkFULL is described in greater detail below in the discussion of the fetcher unit.

Fetcher

Figure 14:
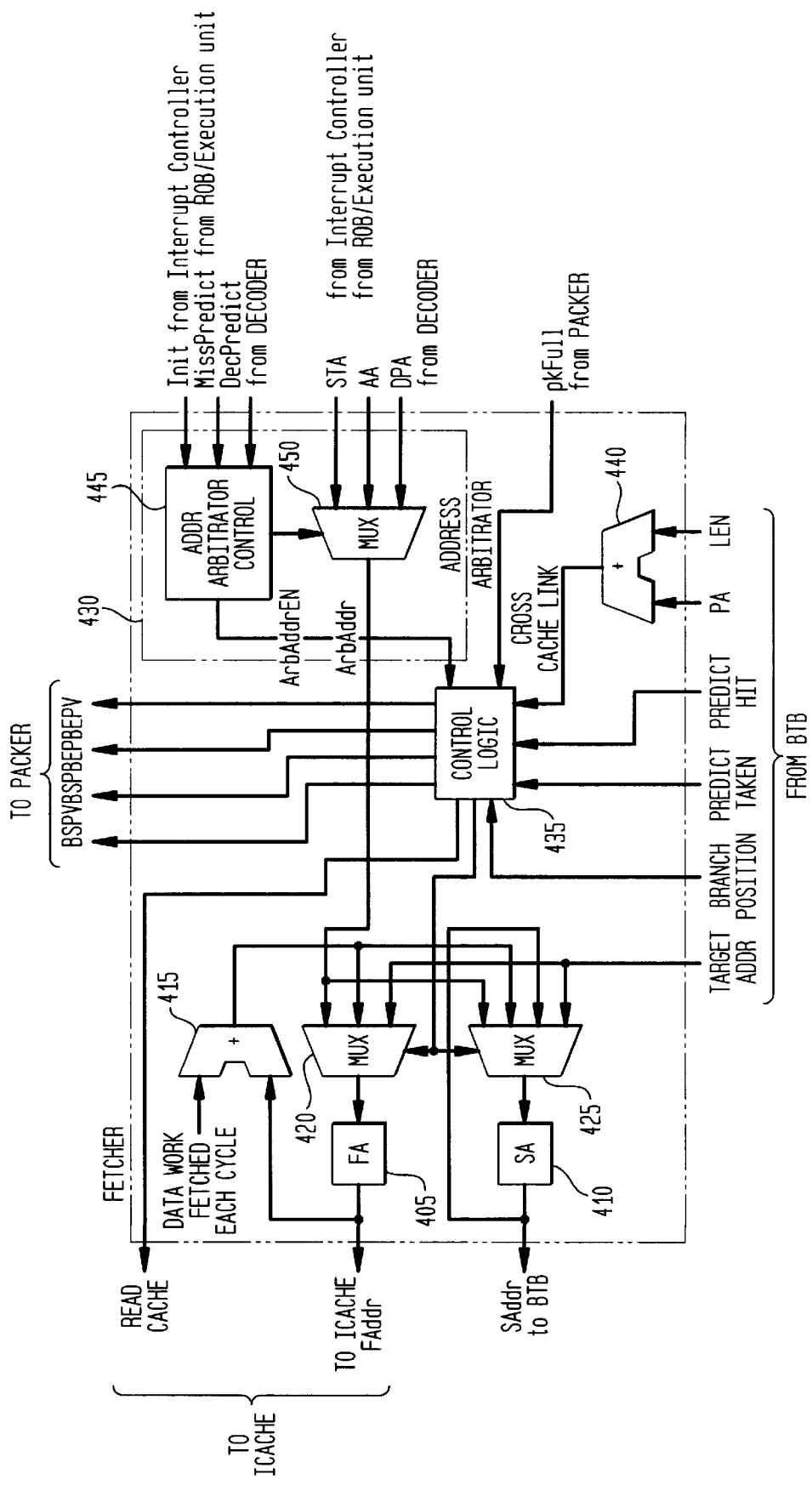
FIG. 14 shows a fetcher according to an embodiment of the present invention.

FIG. 14 shows the fetcher 400 in greater detail. The fetcher 400 has FA selection circuitry which illustratively includes a FA register 405, an adder 415 and a multiplexer 420. Likewise, the fetcher 400 has SA selection circuitry which illustratively includes a SA register 410 and a multiplexer 425. As shown, the output of the FA register 405 is fed back through adder 415 (which increments the address outputted from the FA register 405 by the number of addresses contained in the cache blocks fetched on the previous cycle, rounded down to the nearest cache block address) to multiplexer 420. The other selectable inputs include: TA (received from the branch target buffer 200), the output signal of an address arbitrator 430 (which can be AA, received from the reorder buffer or execution unit 130 of FIG. 8, DPA, received from the decoder unit 120 of FIG. 8, or a starting program address (STA) received from an interrupt controller of the processor, not shown). The role of the address arbitrator 430, and the generation of its respective output signals, are described in greater detail below. The output of the SA register 410 is fed back to multiplexer 425. The other selectable inputs include FA as incremented by the adder 415, TA, or the output of address arbitrator 430 (AA, DPA or STA). The selection control signals for the multiplexers 420 and 425 originate from control logic 435. The generation of such signals is discussed in greater detail below.

The SA is outputted to the branch target buffer 200. In response, the branch target buffer 200 outputs a btbHIT signal (indicating that the branch target buffer 200 has an entry for the SA or no entry therefor, respectively), a btbTAKEN signal (indicating that a branch is predicted to be taken or predicted not to be taken, respectively, when a hit occurs), a btbBRANCHPOS signal (indicating the data word offset of the branch instruction within the searched cache block, which can simply be the offset portion of PA) and the TA, PA and LEN of a branch instruction when a hit and prediction both occur. The PA is added to LEN in adder 440. The resulting signal btbCROSS of the addition is outputted to the control logic 435. The signal btbCROSS indicates whether or not the predicted branch instruction crosses a cache line. In the case of a fetcher 400 which fetches a single cache block per cycle, the signal btbCROSS can be easily generated by detecting whether or not the addition of PA+LEN produces a carry bit to the least significant bit position of the set portion of PA. The btbHIT, btbTAKEN and btbBRANCHPOS signals are also received at the control logic 435. The TA is received as a selectable input at multiplexers 420 and 425 as described above.

The address arbitrator 430 is shown as including an address arbitrator control circuit 445. The address arbitrator control circuit 445 receives an interrupt signal from an interrupt controller (not shown), a MisPredict signal from a reorder buffer (not shown) or execution unit 130 (FIG. 8), and a DecPredict signal from the decoder unit 120 (FIG. 8). The interrupt signal is for purposes of resetting execution to an initial address as in the case where a program is initially executed or on power-on reset. The MisPredict signal is generated by the reorder buffer or execution unit 130 (FIG. 8) in response to detecting an incorrectly predicted branch at the execution unit 130. In other words, a branch was predicted to be taken but in fact was not taken during execution, a branch was predicted not to be taken but was in fact taken during execution or a predicted target address was not the same as the address to which execution branched when the branch instruction was actually executed. The DecPredict signal is generated by the decoder unit 120 (FIG. 8) in the case that the decoder unit 120 (FIG. 8) is capable of forming a prediction at the decoder stage and the prediction (i.e., as to whether or not the branch is taken or the target address) generated at the decoder unit 120 (FIG. 8) did not match the prediction generated by the branch target buffer 200 (FIG. 8). Illustratively, the address at which execution should continue after executing a predicted branch instruction (DPA), as predicted by the decoder unit 120 (FIG. 8), takes precedence over, and overrides, the address at which execution should continue, as predicted by the branch target buffer 200 and fetcher 400. On the other hand, the AA generated by executing a branch instruction in the execution unit 130 (FIG. 8), or stored in the reorder buffer, takes precedence over, and overrides, any PA or DPA predicted by either the branch target buffer 200 (FIG. 8) or the decoder 120 (FIG. 8). Finally, a STA (e.g., to begin executing a new program, or at power-on reset) takes precedence, and overrides, the AA, DPA or PA. In response to the received signals, the address arbitration controller 445 outputs an appropriate select signal to a multiplexer 450. As shown, the multiplexer 450 receives a signal STA from the interrupt controller indicating a program start address. The multiplexer 450 also receives a signal AA from the execution unit 130 (FIG. 8) or reorder buffer indicating an actual address to which execution should branch after executing a branch instruction. The multiplexer 450 furthermore receives a signal DPA indicating an address to which the decoder unit 120 (FIG. 8) has predicted execution will branch in response to executing a branch instruction. The select signal generated by the address arbitration controller 445 is generated so as to select the signal STA in response to receiving the interrupt signal, regardless of whether or not the MisPredict or DecPredict signals are also received. Likewise, the select signal generated by the address arbitration controller 445 selects the signal AA if the interrupt signal is not received, the MisPredict signal is received, and regardless of whether or not the DecPredict signal is received. Finally, the select signal generated by the address arbitration controller 445 selects the signal DPA if the signal DecPredict is received provided that neither the interrupt signal nor the Mispredict signals are also received. The selected address is outputted as ArbAdd. The address arbitration controller 445 can therefore be implemented using a simple priority decoder. The address arbitration controller 445 also generates a signal ArbAddEN for indicating to the control logic 435 whether or not at least one of the interrupt, MisPredict or DecPredict signals was received. In other words, the ArbAddEN indicates to the control logic 435 whether or not an overriding address signal (namely, STA, AA or DPA) has been received.

The control logic 435 receives a number of signals including btbBRANCHPOS, btbHIT, btbTAKEN from the branch target buffer 200, btbCROSS from the adder 440, and ArbAddEN from the address arbitrator circuit 430. In addition, the packet unit 300 (FIG. 8) outputs a signal pkFULL when the queue 310 (FIG. 12) of the packet unit 300 is (nearly) full and cannot receive any more entries. In response to these signals, the control logic 435 generates the signals BS (cache block starting pointer validity indication), BSP (cache block starting pointer), BE (cache block ending pointer validity indication), and BEP (cache block ending pointer) to the packet unit 300 (FIG. 8). The control logic 435 outputs a read cache signal to the instruction cache 110 in response to these signals. Furthermore, the control logic 435 outputs selector control signals to the multiplexers 420 and 425 in response to these signals.

Note that when pkFULL indicates that the packet unit 300 (FIG. 12) is full, the control logic 435 is disabled. That is, the control logic 435 refrains from outputting a read cache signal for reading a cache block from the instruction cache 110 (FIG. 8). Furthermore, the control logic 435 refrains from modifying the other signals until the signal pkFULL indicates that the packet unit 300 (FIG. 12) is not full.

The generation of the remaining signals is described below in pseudo code form. Two examples are shown below, namely, one example where a single cache block is fetched each cycle and a second example where two cache blocks are fetched each cycle. In the examples below, cache_block_size number of data words in each cache block.

EXAMPLE 1

Instruction cache can output up to two cache lines per cycle:

```
if (ArbAddEN indicates that ArbAdd is received) {
/* either STA, AA or DPA is received */
    FA = ArbAdd;
    SA = ArbAdd;
    BS = 1;      BSP = offset (ArbAdd);
    BE = 0;      BEP = -offset(0);
}
else if (btbHIT && btbTAKEN) {
/* branch target buffer detects a branch predicted to be taken */
    if (start_flag) {
    /* retrieved the instruction data of the target sequence */
        BS = 1;      BSP = offset(FA);
    }
    if ((PA + LEN) ≥ cache block of FA + cache_block_size)
    /* tell the packet unit to advance the queue pointer two
    cache blocks */
        double_cache = 1
    else
    /* tell packet unit to advance the queue pointer one cache block */
        double_cache = 0
    if (btbCROSS) {
    /* predicted branch instruction crosses multiple cache blocks
```

```
            but not all of */
            /* the cache blocks containing the branch instruction were fetched */
                 FA = cache block of FA + 2cache_block_size;
                 SA = SA;
                 reset start_flag;
                 BE = 0;         BEP = -offset(0);
            }
            else {
            /* predicted branch instruction ends in a previously fetched
            cache block */
                 FA = TA;
                 SA = TA;
                 set start flag;
                 BS = 0;         BSP = 0;
                 BE = 1;         BEP = offset(PA + LEN);
            }
       else {
       /* no branch instructions predicted to be taken or executed */
            FA = FA + 2*cache_block_size masked to next cache block;
            SA = FA + 2*cache_block_size masked to next cache block;
            BS = 0;         BSP = 0;
            BE = 0;         BEP = -offset(0);
       }
```

EXAMPLE 2

Instruction cache can output only a single cache line per cycle:

```
if (ArbAddEN indicates that ArbAdd is received) {
/* either STA, AA or DPA is received */
     FA = ArbAdd;
     SA = ArbAdd;
     BS = 1;         BSP = offset (ArbAdd);
     BE = 0;         BEP = -offset(0);
}
else if (btbHIT && btbTAKEN) {
/* branch target buffer detects a branch predicted to be taken */
       if (start_flag) {
       /* retrieved the instruction data of the target sequence */
            BS = 1;         BSP = offset(FA);
       }
       if(btbCROSS) {
            /* predicted branch instruction crosses multiple cache blocks
            but not all of */
            /* the cache blocks containing the branch instruction were fetched */
                 FA = cache block of FA + 2*cache_block_size;
                 SA = SA;
                 reset start_flag;
                 BE = 0;         BEP = -offset(0);
            }
            else {
            /* predicted branch instruction ends in a previously fetched
            cache block */
                 FA = TA;
                 SA = TA;
                 set start flag;
                 BS = 0;         BSP = 0;
                 BE = 1;         BEP = offset(PA + LEN);
            }
       else {
       /* no branch instructions predicted to be taken or executed */
       FA = FA + cache_block_size masked to next cache block;
       SA = FA + cache_block_size masked to next cache block;
       BS = 0           BSP = 0;
       BE = 0;          BEP = -offset(0);
       }
```

The operation is now explained in greater detail. Consider first the case where the address arbitrator 430 outputs the signal ArbAddEN indicating that it is outputting a valid address ArbAdd. Such an address may be the STA, AA or DPA. In any event, the control logic 435 responds by outputting a select control signal to the multiplexers 420 and 425 for selecting the ArbAdd address for storage in the FA and SA registers 405 and 410. Thus, SA=ArbAdd and FA=ArbAdd. In addition, when an ArbAdd occurs, it indicates the beginning of an instruction sequence wherein the current instruction sequence ends abruptly and will be discarded. Thus, the control logic 435 outputs BS=1 to indicate that a new instruction sequence begins and BSP=the offset portion of ArbAdd. The control logic 435 also outputs BE=0 and BEP equal to its maximum value of -offset(0).

Now consider the case where the last issued SA did not result in btbHIT indicating that a branch hit occurred (i.e., did not result in the branch target buffer 200 identifying a branch instruction) or did not result in btbTAKEN indicating that a branch was identified and predicted to be taken (i.e., may have resulted in the branch target buffer 200 identifying one or more branches, but did not result in the branch target buffer 200 predicting any of the identified branches to be taken). In such a case, both FA and SA are simply advanced to the next cache block address. In the case that two blocks are fetched each cycle, FA and SA are advanced to cache block address (cache block of FA+2*cache_block_size). On the other hand, in the case that only a single cache block is fetched each cycle, FA is advanced to the next cache block address (cache block of FA+cache_block_size). This is achieved by the control logic 435 outputting a select control signal to the multiplexers 420 and 425 for selecting the output of the adder 415. The control logic 435 furthermore simultaneously outputs the read cache signal while the registers 405 and 410 output the new FA and SA. The control logic 435 furthermore outputs the signals BS=0 BE =0, BSP =0 and BEP equal to its maximum value, e.g., -offset(0). Thus, the fetched cache block is stored in the queue 310 (FIG. 12) of the packet unit 300 (FIG. 8) with no indication of an instruction sequence end or instruction sequence beginning and with the appropriate ending pointer.

Next, consider the case where no ArbAddEN signal is received indicating that a valid ArbAdd signal is outputted. However, btbHIT and btbPREDICT indicate that at least one branch instruction has been predicted to occur after the last SA and is furthermore predicted to be taken. As noted above, the branch target buffer 200 (FIG. 8) can search up to two cache blocks for branch instructions. Furthermore, an identified branch instruction may cross multiple cache blocks. It is important for the fetcher 400 to ensure that all cache blocks up to the cache block containing the ending data word of the predicted, taken branch instruction are fetched. How this check is performed depends on how many cache lines are fetched by the fetcher 400 each cycle. For instance, if the fetcher 400 fetches two cache blocks per cycle, i.e., the cache block containing FA and the cache block following it, then the control logic 435 performs a check to determine if btbCROSS=1, i.e., if PA+LEN (the address of the ending data word of the predicted taken branch instruction) is greater than or equal to the cache block address following the last fetched cache block (i.e., ≧cache block of FA+2*cache_block_size). On the other hand, if only a single cache block is fetched by the fetcher 400 each cycle, then btbCROSS=1 is equivalent to determining if PA+LEN≧cache block of FA+cache_block_size. If this condition is true, then the last data word of the predicted branch instruction is contained in a cache block not yet fetched. In such a case, the control logic 435 increments the FA to fetch one or more of the next blocks following the last fetched block. In the case where the fetcher 400 fetches two cache blocks per cycle, the control logic 435 sets FA equal to the cache block of FA+2*cache_block_size (example 1). Likewise, in the case where the fetcher 400 fetches only a single cache block per cycle, the control logic 435 sets FA equal to the cache block of FA+cache_block-size (example 2). Again this is achieved by the control logic 435 outputting a select control signal to the multiplexer 420 for selecting the output of the adder 415. This value is stored in the FA register 405 and outputted to the instruction cache 110 (FIG. 8) when the read cache signal is outputted.

While it is desirable to fetch the remaining cache blocks containing the missing portions of the predicted branch instruction, it is not desirable to change the branch prediction. Thus, while FA is increased to fetch one or more of the next cache blocks, SA is held constant. To that end, the select control signal outputted to the multiplexer 425 causes the multiplexer to select the SA stored in the register 410 for input to the register 410. This causes the branch target buffer 200 (FIG. 8) to reproduce the same prediction result. Thus, in the case of a predicted taken branch instruction crossing multiple cache blocks, it is possible for the FA and the SA to have different values.

It is possible that more than one cycle may be needed to fetch the cache blocks containing missing portions of the predicted, taken branch instruction. For instance, the fetcher 400 may only fetch a single cache block per cycle. However, the branch target buffer 200 (FIG. 8) can perform a prediction on the fetched cache block and the cache block immediately following the fetched cache block. Thus, it is possible that the predicted taken branch instruction begins in the cache block (e.g., at cache block address n+1) immediately following the last fetched cache block (e.g., at cache block address n) but ends in the cache block that is two cache block addresses away from the last fetched cache block (e.g., at cache block address n+2). Thus, two cycles may be needed to fetch all of the cache blocks containing portions of the predicted, take branch instruction. In any event, the control logic 435 increases FA each time but SA is maintained constant (i.e., during times when PA+LEN is in a cache block not yet fetched).

Eventually, or initially, the signals btbHIT=1 and btbTAKEN=1 are received, indicating that a branch is predicted to be taken, and the signal btbCROSS=0 is received, indicating that the predicted taken branch is entirely contained in one of the most recently fetched cache blocks. In such a case, an instruction sequence end occurs. Thus, the control logic 435 outputs BE=1 (to indicate that BEP is valid). Furthermore, the control logic 435 outputs BEP equal to the offset of the ending data word of the predicted, taken branch instruction, namely, the offset(PA+LEN) or btbBRANCHPOS. The control logic 435 causes FA to equal TA, so as to fetch the cache block containing the target address, and also causes SA to equal to TA, so as to begin a search for taken branch instructions at TA. This is achieved by the control logic 435 outputting an appropriate select control signal to the multiplexers 420 and 425 for selecting TA for input to the registers 405 and 410. The signal FA=TA is outputted to the instruction cache 110 (FIG. 8) and the signal SA=TA is outputted to the branch target buffer 200 (FIG. 8).

It is known that the fetched cache block containing TA contains the start of a new instruction sequence. Therefore, the control logic 435 also sets a flag start_flag. On the next cycle, when the cache block containing TA is fetched, the set start flag causes the control logic 435 to output BS=1 to indicate that BSP is valid and to output BSP=offset(TA) to the packet unit 300 (FIG. 8). Thus, the starting point of the instruction sequence in the cache block containing TA is stored in the packet unit 300 (FIG. 8).

In addition, in the case where the fetcher 400 can fetch two cache blocks per cycle, the control logic 435 may check to determine if the predicted taken branch instruction ends in the first or the second of the two fetched cache blocks (i.e., if PA+LEN≧cache block of FA+cache_block_size). If the predicted, taken branch instruction ends in the second of the two cache blocks, then the instruction sequence contains data in both cache blocks and no special processing is performed. The control logic 435 simply outputs a signal double_cache=1 to the queue controller 320 (FIG. 12) of the packet unit 300 (FIG. 8) to cause both of the two cache lines to be stored in the next two available cache block storage locations of the queue 310 (FIG. 12). (The queue controller 320 thereafter increments a pointer by two cache block storage locations so that it points to the cache block storage location of the queue 310 (FIG. 8) following the second of the two fetched cache blocks.) On the other hand, if the predicted, taken branch instruction ends in the first of the two cache blocks, the control logic 435 outputs to the packet unit 300 (FIG. 8) a signal double_cache=0. In response, the packet unit 300 (FIG. 8) discards the second cache block. The packet unit queue 310 (FIG. 12) stores the outputted BE and BEP signals with the first of the two cache blocks (which is not discarded).

The operation of the processor 100 is now described in further detail using an example. Consider the case where the fetched instructions are as follows:

| cache block | address | instruction | | |
|---|---|---|---|---|
| 000 | 0 × 0000 | | ADD | R1, R2, R3 |
| 001 | : | : | : | |
| 002 | : | : | : | |
| 003 | : | : | : | |
| 004 | 0 × 0048 | | JMP | 0 × 00E8 |
| | 0 × 004B | | ... | ... |
| | : | : | : | |
| 00E | 0 × 00EC | BNE | R1, R2, 0 × 010A | |
| 00F | 0 × 00F1 | | MOV | R3, R2 |
| 010 | 0 × 010A | ... | ... | |
| 011 | : | : | : | |
| 012 | : | : | : | |
| 013 | : | : | : | |
| 014 | : | : | : | |
| 015 | : | : | : | |

In this example, assume that only two branch instructions will be predicted to be taken by the branch target buffer 200, namely, the branch instruction stored at 0x0048–0x004A and the branch instruction stored at 0x00EC-0x00F0. Note that the first branch instruction is entirely contained within a single cache block, namely, cache block 0x004. On the other hand, the second branch instruction crosses two cache blocks, namely 0x00E and 0x00F. The fetcher 400 is furthermore presumed to fetch only a single cache block each cycle.

Figure 15:
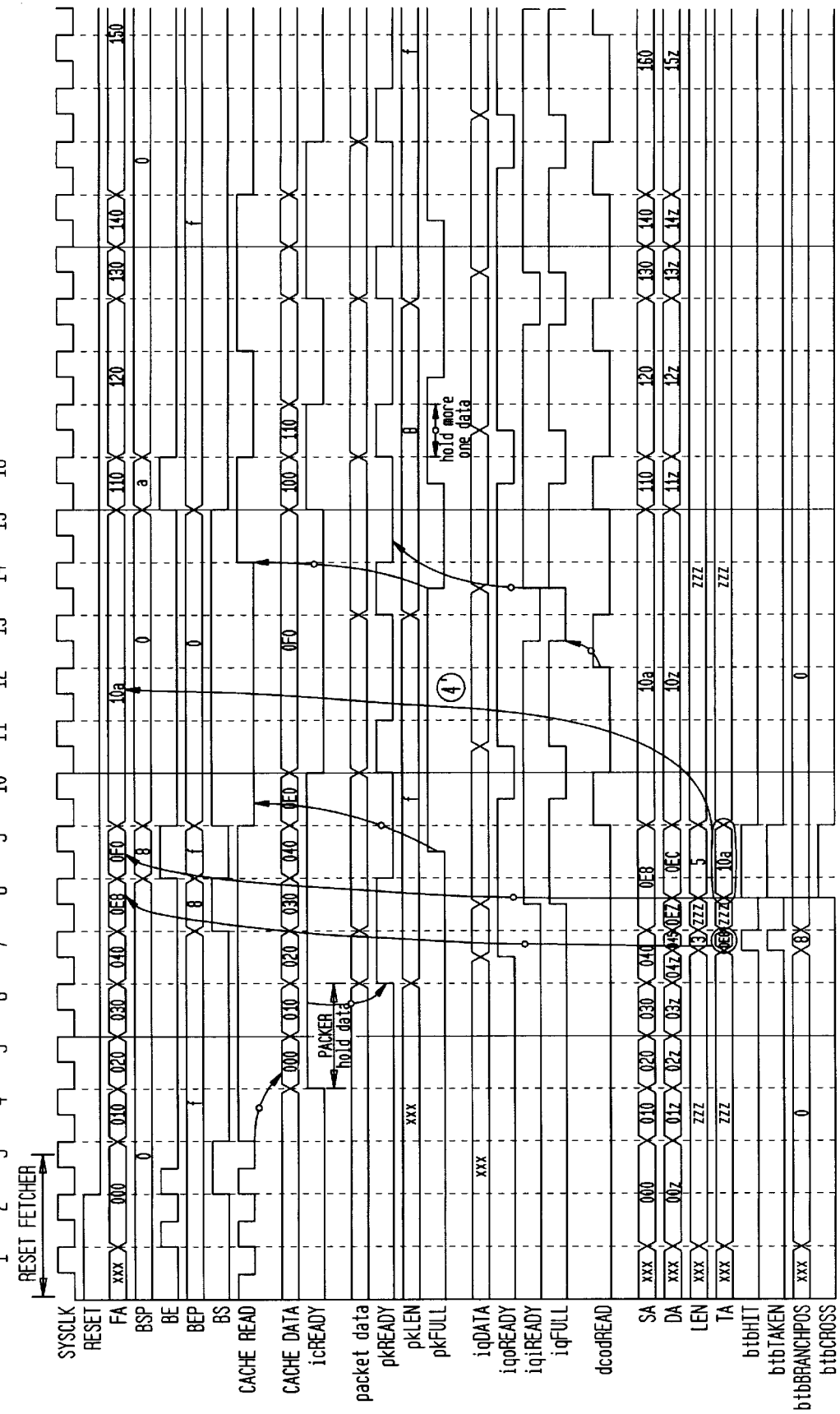
FIG. 15 shows a timing diagram illustrating the operation of the fetcher.

A timing diagram for the signals generated in the processor 100 is shown in FIG. 15. In addition to those timing signals described above, additional timing signals icREADY, iqDATA, iq0READY, iq1READY, iqFULL, pkLEN, pkREADY and decodeREADY generated in the processor 100 are shown for sake of completeness. Since these signals do not directly influence the operation of the invention, they are not described or only briefly described.

On cycles 1 and 2, a RESET interrupt signal is received at the address arbitrator 430. Furthermore, on cycle 1, a start address 0x0000 is received in the signal STA. STA is outputted from the address arbitrator 430 as ArbAdd and the signal ArbAddEN is also outputted from the address arbitrator 430 to the control logic 435. The control logic 435 outputs a select control signal that causes the STA=0x0000 to be stored in the registers 405 and 410. Thus, beginning with cycle 2, the addresses FA=0x0000 and SA=0x0000 are outputted from the fetcher 400 to the instruction cache 110 and branch target buffer 200, respectively. However, the fetcher 400 refrains from outputting a read cache signal indicating that it is ready to receive data until the cycle after the RESET interrupt signal is no longer received (cycle 4).

On cycle 3, the RESET interrupt ceases to be received at the address arbitrator 430. As such, the address arbitrator 430 ceases to output the signal ArbAddEN indicating that a valid ArbAdd was received. This enables the logic circuit 435 to output select control signals to the multiplexer 420 and 425 for changing the values selected to be stored in the registers 405 and 410. In this case, btbHIT=0 and btbTAKEN=0 (no branch instructions predicted or predicted to be taken, in response to SA=0x0000) so the control logic 435 outputs select control signals for causing the multiplexers 420 and 425 to select the output of the adder 415. Assume that the fetcher 400 fetches only a single cache block per cycle. As such, the address outputted form the adder 415 is 0x000. This is stored in the FA and SA registers 405 and 410. In addition, the control logic 435 outputs the signals BS=1 and BSP=offset(FA). In this case, the offset (FA=0x0000)=0.

On cycle 4, the FA=0x0010 is outputted to the instruction cache 110 and the SA=0x0001 is outputted to the branch target buffer 200. The address 0x0020 is stored in the FA register 405 and in the SA register 410. The control logic 435 furthermore outputs a cache read signal indicating that it is ready to receive data. In response, the instruction cache 110 retrieves the cache block at address 0x000 (requested on cycle 3) and outputs this cache block to the packet unit (which cache block is stored in the packet unit 300 on cycle 5). This event is indicated by the label 1. No predicted branch instruction is detected at the fetcher 400 in response to the address SA=0x0000 outputted on cycle 3 (btbHIT=0 and btbTAKEN=0 are received). As such, the control logic 435 outputs the signals BS=0 and BSP=0.

On cycle 5, no predicted branch instruction is detected at the fetcher 400 in response to the SA=0x0010 outputted on cycle 4 (btbfIfT=0 and btbTAKEN=0 are received). The address 0x0030 is stored in the FA and SA registers 405 and 410. The fetcher 400 outputs FA=0x0020 and SA=0x0020. The cache block at address 0x000 is stored in the packet unit 300. (The signals BS=1 and BSP=offset(FA=0x0000) outputted from the fetcher 400 on cycle 3 are stored with the cache block 0x000 in the packet unit 300). The fetcher 400 continues to output the read cache signal indicating that it is ready to read data. Thus, the cache block at address 0x00 is retrieved and outputted by the instruction cache 110.

On cycle 6, no predicted branch instruction is detected at the fetcher 400 in response to the SA=0x0020 outputted on cycle 5 (btbHIT=0 and btbTAKEN=0). The address 0x0040 is stored in the FA and SA registers 405 and 410. The fetcher 400 outputs FA=0x0030 and SA=0x0030. The cache block at address 0x001 outputted from the instruction cache 110 on cycle 4 is stored in the packet unit 300. The fetcher 400 continues to output the read cache signal indicating that it is ready to read data. Thus, the cache block at address 0x002 is retrieved and outputted by the instruction cache 110.

Once the packet unit 300 has two cache blocks stored therein, e.g., such as at the beginning of cycle 7, the packet unit 300 outputs a pkREADY signal to the decoder 120 indicating that it is ready to output cache blocks of continuous instruction data words for decoding. This event is indicated by label 2 in FIG. 15. The fetcher 400 outputs FA=0x0040 and SA=0x0040. Meanwhile, the cache block at address 0x002 requested from the instruction cache 110 on cycle 5 is stored in the packet unit 300. The fetcher 400 continues to output the read cache signal indicating that it is ready to read data. Thus, the cache block at address 0x003 is retrieved for output by the instruction cache 110.

As shown, the SA=0x0040 outputted at the beginning of cycle 7 results in the signals btbHIT=1 and btbTAKEN=1 being outputted from the branch target buffer 200 by the end of cycle 7. In addition, the signals PA=0x0048, LEN=3, TA=0x00E8 and btbBRANCHPOS=8 are outputted at the end of cycle 7. Because PA=0x0048+LEN=3 is not greater than the cache block address of FA=0x0040+cache_block_size=F (or 0x004F), btbCROSS=0 and therefore does not indicate that the branch instruction crosses multiple cache blocks. As such, the control logic 435 causes the multiplexers 420 and 425 to select TA for storage in the FA and SA registers 405 and 410. This is indicated by label 3 in FIG. 15.

Note also that starting on cycle 7, the packet unit 300 generates the signal pkLEN=F. This pkLEN corresponds to the ending pointer of the output cache blocks formed from the cache blocks in the queue 310 (FIG. 12).

On cycle 8, the control logic 435 outputs the signal BE=1 to indicate that a valid BEP signal is outputted. The control logic 435 furthermore outputs the signal BEP=offset(PA+LEN) (btbBRANCHPOS) to indicate that the last data word in the predicted, taken branch instruction is the last data word of a sequence. The control logic 435 sets start_flag so that the appropriate signals BS and BSP will be outputted on cycle 9. The FA=0x00E8 is outputted to the instruction cache 110. In response, the instruction cache 110 retrieves and outputs the cache block stored at address 0x00E. Meanwhile, the cache block at address 0x003 outputted form the instruction cache 110 on cycle 6 is stored in the packet unit 300.

The SA=0x00E8 is outputted to the branch target buffer 200. In response, the branch target buffer 200 generates btbHIT=1 and btbTAKEN=1 signals to indicate that a branch instruction is predicted to be taken. The signals PA=0x00EC, LEN=5, TA=0x010A, and btbBRANCHPOS=A signals are also outputted from the branch target buffer 200 to the fetcher 400. Note that in this case, PA+LEN=0x00F0>cache block address of FA+cache_block_size (0x00E0+F=0x00EF). In other words, the predicted taken branch instruction crosses the cache lines 0x00E and 0x00F wherein only 0x00E has been fetched from the instruction cache. As such, the signal btbCROSS=1 is outputted from the adder 440 to the control logic 435. In response, the control logic 435 outputs a select control signal to the multiplexer 420 for selecting the address outputted from the adder 415 (namely, 0x00F0) for storage in the FA register 405. This is indicated by the label 4 in FIG. 15. On the other hand, the control logic 435 outputs a select control signal for storing the address currently outputted from the SA register 410 (namely, 0x00E8) for storage in the register SA.

As a result of storing 0x00F0 in the FA register 405 on cycle 9, the fetcher 400 outputs FA=0x00F0 to the instruction cache 110 on cycle 9. As a result, the instruction cache 110 retrieves and outputs the cache block at address 0x00F. Meanwhile, the packet unit 300 stores the cache block of address 0x004 in the queue 310. On the other hand, the address 0x00E8 stored in the SA register 410 on cycle 8 is outputted to the branch target buffer 200. This causes the branch target buffer 200 to once again output the signals btb-HIT=1 and btbTAKEN=1, PA=0x00EC, LEN=5, TA=0x010A, and btbBRANCHPOS=A. However, this time the adder 440 outputs the signal btbCROSS=0 to indicate that the ending data word of the predicted branch instruction is contained within a cache block already retrieved. Thus, the control logic 435 causes the multiplexers 420 and 425 to store the TA=0x010A in the FA and SA registers 405 and 410. This is indicated by label 4' in FIG. 15. At this time, the control logic 435 also sets start_flag.

At the end of cycle 9, the queue 310 (FIG. 12) of the packet unit 300 illustratively becomes nearly full. As such, the packet unit 300 outputs the signal pkFULL=1 to indicate that it is nearly full and shortly will not accept any more data. This pkFULL signal is received at the control logic 435 which responds on cycle 10 by outputting a cache read signal=0 indicating that it is not ready to receive a cache block. This is indicated by the label 5 in FIG. 15. The signals FA=0x010A and SA=0x010A are outputted to the instruction cache 110 and branch target buffer 200, respectively. However, the instruction cache 110 does not output any data. Furthermore, the control logic 435 ignores any signals outputted by the branch target buffer 200 so long as the signal pkFULL=1 is received. As a result of the setting of start flag, the signals BS=1 and BSP=offset(TA)= btbBRANCHPOS are also outputted. However, the packet unit 300 ignores these signals. Since the control logic 435 is disabled, start_flag is not reset and the signals BS=1 and BSP=A are continually outputted until such time that the control logic 435 is once again enabled.

Also note that the decoder 120 outputs a signal decodeREAD=1 to the packet unit 300 so as to retrieve the first packed and aligned output block of data words. The times at which output blocks must be retrieved depend upon how many cycles are required by the decoder 120 to decode all of the instructions in such an output cache block. This illustration assumes that three cycles are required to decode each output block. As such, FIG. 15 shows that the decoder 120 outputs the signal decodeREAD=1 every third cycle.

On cycles 10 and 11, the packet unit 300 stores the fetched cache blocks at addresses 0x00E (and the BE=1, and BEP=8 signals previously outputted on cycle 8) and 0x00F, respectively, previously fetched from the instruction cache on cycles 8 and 9, respectively.

Eventually, on cycle 14, the decoder 120 reads enough cache blocks to create a vacancy in the queue 310 of the packet unit 300 for receiving more cache blocks. Thus, the packet unit 300 outputs the signal pkFULL=0 to indicate that it can receive more cache blocks. On the next cycle 15, the control logic 435 responds to the signal pkFULL by outputting the signal read cache=1. This causes the instruction cache 110 to output the cache block of address 0x010. Since the branch target buffer 200 does not produce btbHIT=1 or btbTAKEN=1, the control logic 435 simply causes the address 0x011 outputted from adder 415 to be stored in registers 405 and 410.

On cycle 16, the packet unit 300 stores the cache block of address 0x010 with the signals BS=1 and BSP=A. Once again, the packet unit 300 becomes nearly full and outputs the signal pkFULL=1 so as to disable the fetcher 400.

Conclusion

In short, a processor architecture is disclosed including a fetcher, packet unit and branch target buffer. The branch target buffer is provided with a tag RAM that is organized in a set associative fashion. In response to receiving a search address, multiple sets in the tag RAM are simultaneously searched for a branch instruction that is predicted to be taken.

The packet unit has a queue into which fetched cache blocks are stored containing instructions. Sequentially fetched cache blocks are stored in adjacent locations of the queue. The queue entries also have indicators that indicate whether or not a starting or final data word of an instruction sequence is contained in the queue entry and if so, an offset indicating the particular starting or final data word. In response, the packet unit concatenates data words of an instruction sequence into contiguous blocks.

The fetcher generates a fetch address for fetching a cache block from the instruction cache containing instructions to be executed. The fetcher also generates a search address for output to the branch target buffer. In response to the branch target buffer detecting a taken branch that crosses multiple cache blocks, the fetch address is increased so that it points to the next cache block to be fetched but the search address is maintained the same.

Finally, the above-discussion is intended to be merely illustrative of the invention. Numerous alternative embodiments may be devised by those having ordinary skill in the art without departing from the spirit and scope of the following claims.

The claimed invention is:

1. A method for predicting a branch address in a sequence of variable length instructions using a branch target buffer organized into blocks, wherein each instruction begins at an address that has a tag portion, a set portion and an offset portion, wherein said branch target buffer is organized into equal sized blocks of memory locations, each block being assigned to a set of plural addresses and configured to store multiple entries which each contain a tag address portion and prediction information of a branch instruction that begins at an address having a set address portion that matches said set to which said block is assigned, said method comprising the steps of:

(a) receiving a search address,
   (b) retrieving a first block assigned to a first set corresponding to a set portion of said search address,
   (c) retrieving a second block assigned to a set following said first set,
   (d) simultaneously comparing a tag address portion contained in each entry of said first and second blocks to a tag portion of said search address,
   (e) based on said comparisons in step (d), identifying the block entry of the branch instruction that is predicted to be taken, if any, having the nearest address to, and which at least equals, said search address.

2. The method of claim 1 wherein said branch target buffer comprises a second group of entries including one second entry corresponding to each entry of each block, each second entry containing an indication of a target address to which a branch instruction, of said corresponding entry of said block, is predicted to branch execution, said method further comprising the steps of:

(f) retrieving said indication of said target address of a second entry corresponding to said identified block entry.

3. The method of claim 2 wherein each of said second entries also contains a predicted length of said branch instruction of said corresponding block entry, said method further comprising:

(g) retrieving said predicted length of said branch instruction stored in a second entry corresponding to said identified block entry.

4. The method of claim 1 wherein each of said entries of said blocks also contains an offset address portion of said branch instruction corresponding to said entry, said method further comprising the steps of:

(f) comparing each tag address portion contained in an entry of said first block to said tag portion of said search address, (g) comparing each tag address portion contained in an entry of said second block to a value which depends on said tag portion of said search address, (h) using said prediction information in each of said entries of said first and second blocks, determining which entries correspond to branches predicted to be taken, (i) prioritizing amongst said entries corresponding to branches predicted to be taken according to said offset address portions stored in said entries, (j) selecting an entry, if any, of said first block containing an offset address portion nearest and greater than or equal to an offset portion of said search address of all entries of said first block containing a tag address portion that matches said tag portion of said search address, and (k) in response to failing to select an entry in step (j), selecting an entry, if any, of said second block that contains a smallest offset address portion of all entries of said second block containing a tag address portion that matches said value which depends on said tag portion of said search address.

5. A method of fetching variable length instructions comprising the steps of:

(a) outputting a fetch address (FA) to an instruction cache for fetching a sequence of one or more blocks of sequential data words including a data word specified by FA, (b) outputting a search address (SA) that equals FA to a branch target buffer to determine if a branch instruction begins in a block on or after FA, (c) receiving from said branch target buffer an indication of whether or not a taken branch instruction is predicted to begin in said fetched block on or after FA, a predicted address (PA) of a data word on which said branch instruction begins, a length (LEN) of said predicted branch instruction and a target address (TA) to which execution is predicted to branch, and (d) in response to receiving an indication that a taken branch is predicted to begin in a block after FA, if said predicted branch instruction is not entirely contained in said fetched blocks, outputting to said instruction cache as said FA an address of a cache block following a said sequence of fetched cache blocks, and outputting to said branch target buffer said same SA as in step (b).

6. The method of claim 5 further comprising the steps of:

(e) in response to receiving said indication that a taken branch instruction is predicted to end in one of said fetched blocks corresponding to said FA=PA+LEN, outputting to a packet unit a first indication that said fetched block corresponding to FA=PA+LEN contains an end of an instruction sequence and outputting an offset portion of said FA=PA+LEN as an offset within said block corresponding to FA=PA+LEN indicating a final data word of said instruction sequence, (f) outputting said TA to said instruction cache as said FA, (g) outputting said TA to said branch target buffer as said SA, (h) outputting to said packet unit another indication that said fetched block corresponding to FA=TA contains a beginning of an instruction sequence and outputting an offset portion of said TA as an offset within said block corresponding to FA=TA of an initial data word of said instruction sequence.

7. The method of claim 5 further comprising the steps of:

(e) in response to receiving an indication that no taken branch is predicted to begin in one of said fetched blocks after FA, outputting first and second indications to a packet unit indicating that no initial or final data word of an instruction sequence is contained in said fetched blocks.

8. The method of claim 5 further comprising the steps of:

(e) decoding at least one branch instruction in a decoder, (f) predicting that said branch instruction will cause a branch in execution to be taken and predicting a decoder predicted address (DPA) to which execution will branch, (g) determining whether or not said branch target buffer erred in predicting said branch instruction predicted by said decoder, (h) in response to determining that said branch target buffer erred in predicting said branch instruction predicted by said decoder, outputting said DPA to said instruction cache as said FA, and outputting said DPA to said branch target buffer as said SA.

9. The method of claim 5 further comprising the steps of:

(e) executing a branch instruction in an execution unit, (f) determining whether or not an error occurred in predicting said branch instruction executed by said execution unit, and (g) in response to determining that an error occurred in predicting said branch instruction executed by said execution unit, outputting to said instruction cache as said FA an actual address (AA) to which execution branches in executing said branch instruction and outputting said AA as said SA to said branch target buffer.

10. A branch target buffer for predicting a branch address in a sequence of variable length instructions, wherein each instruction begins at an address that has a tag portion, a set portion and an offset portion, comprising:

a tag RAM organized into equal sized blocks of memory locations, each block being assigned to a set of plural addresses and configured to store multiple entries which each contain a tag address portion and prediction information of a branch instruction that begins at an address having a set address portion that matches said set to which said block is assigned, a decoder configured to receive a search address, retrieve a first block assigned to a first set corresponding to a set portion of said search address, and retrieve a second block assigned to a set following said first set, and circuitry configured to simultaneously compare a tag address portion contained in each entry of said first and second blocks to a tag portion of said search address, and based on said comparisons identify the block entry of the branch instruction that is predicted to be taken, if any, having the nearest address to, and which at least equals, said search address.

11. A fetcher for fetching variable length instructions comprising:

fetch address circuitry configured to output a fetch address (FA) to an instruction cache for fetching one or more blocks of sequential data words including a data word specified by FA, search address circuitry configured to output a search address (SA) that equals FA to a branch target buffer to determine if a branch instruction begins in a block on or after FA, a adder for receiving a predicted address (PA) of a data word on which said branch instruction begins and a length (LEN) of said predicted branch instruction from said branch target buffer, and a control circuit which receives an indication of whether or not a taken branch instruction is predicted to begin in a block after FA from said branch target buffer and in response to said predicted branch instruction being contained only partly in said fetched blocks and partly in a subsequent block, causing said fetch address circuitry to output to said instruction cache as said FA an address of said subsequent block, and causing said search address circuitry to output to said branch target buffer said same SA.

* * * * *